United States Patent
Ajami et al.

(10) Patent No.: US 12,170,971 B2
(45) Date of Patent: Dec. 17, 2024

(54) TIME SYNCHRONIZATION FOR COORDINATED RESTRICTED TARGET WAKE TIME (R-TWT) OPERATION

(71) Applicant: QUALCOMM Incorporated, San Diego, CA (US)

(72) Inventors: Abdel Karim Ajami, San Diego, CA (US); Sai Yiu Duncan Ho, San Diego, CA (US); Alfred Asterjadhi, San Diego, CA (US); George Cherian, San Diego, CA (US); Abhishek Pramod Patil, San Diego, CA (US); Yanjun Sun, San Diego, CA (US); Gaurang Naik, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 589 days.

(21) Appl. No.: 17/533,092

(22) Filed: Nov. 22, 2021

(65) Prior Publication Data

US 2023/0164709 A1    May 25, 2023

(51) Int. Cl.
*H04W 56/00* (2009.01)
(52) U.S. Cl.
CPC .................. *H04W 56/001* (2013.01)
(58) Field of Classification Search
CPC ........... H04W 56/001; H04W 56/0015; H04W 56/002
See application file for complete search history.

(56) References Cited

U.S. PATENT DOCUMENTS

| 2017/0006616 A1* | 1/2017 | Singh ................ H04W 74/0808 |
| 2018/0279209 A1* | 9/2018 | Fang ..................... H04L 27/261 |
| 2020/0137702 A1 | 4/2020 | Patil et al. |

FOREIGN PATENT DOCUMENTS

| EP | 3820225 A1 | 5/2021 |
| WO | WO-2022132030 A1 | 6/2022 |

OTHER PUBLICATIONS

International Search Report and Written Opinion—PCT/US2022/044720—ISA/EPO—Jan. 2, 2023.

\* cited by examiner

*Primary Examiner* — Kyaw Z Soe
(74) *Attorney, Agent, or Firm* — Holland & Hart / QUALCOMM Incorporated

(57) ABSTRACT

This disclosure provides systems, methods and apparatus, including computer programs encoded on computer storage media, for coordinated scheduling of service periods (SPs). In some aspects, an access point (AP) may receive timing information indicating an SP associated with an overlapping basic service set (OBSS) and may transmit, to its associated STAs, coordinated timing information indicating the timing of the SP in relation to its timing synchronization function (TSF) timer. In some aspects, the AP may adjust the timing information to account for an offset between its TSF timer and a TSF timer associated with the OBSS. In some other aspects, the AP may synchronize its TSF timer with the TSF timer associated with the OBSS. The AP may further communicate with the STAs based on the coordinated timing information. For example, the AP may schedule communications with the STAs to be orthogonal to communications in the OBSS during the SP.

44 Claims, 15 Drawing Sheets

1100

```
┌─────────────────────────────────────────────────────────────┐
│ Synchronize a local TSF timer with a first TSF timer associated with │
│                        a BSS. (1102)                        │
└─────────────────────────────────────────────────────────────┘
                              │
                              ▼
┌─────────────────────────────────────────────────────────────┐
│ Receive timing information indicating a timing of a first SP │
│ associated with an OBSS, where the timing information is associated │
│                with the first TSF timer. (1104)             │
└─────────────────────────────────────────────────────────────┘
                              │
                              ▼
┌─────────────────────────────────────────────────────────────┐
│ Communicate with one or more devices associated with the BSS and │
│           the received timing information. (1106)           │
└─────────────────────────────────────────────────────────────┘
```

Figure 11

TIME SYNCHRONIZATION FOR COORDINATED RESTRICTED TARGET WAKE TIME (R-TWT) OPERATION

TECHNICAL FIELD

This disclosure relates generally to wireless communication, and more specifically, to time synchronization for coordinated restricted target wake time (r-TWT) operation.

DESCRIPTION OF THE RELATED TECHNOLOGY

A wireless local area network (WLAN) may be formed by one or more access points (APs) that provide a shared wireless medium for use by a number of client devices or stations (STAs). Each AP, which may correspond to a Basic Service Set (BSS), may periodically broadcast beacon frames to enable any STAs within wireless range of the AP to establish and maintain a communication link with the WLAN. WLANs that operate in accordance with the IEEE 802.11 family of standards are commonly referred to as Wi-Fi networks.

Some wireless communication devices may be associated with low-latency applications having strict end-to-end latency, throughput, and timing requirements for data traffic. Example low-latency applications include, but are not limited to, real-time gaming applications, video communications, and augmented reality (AR) and virtual reality (VR) applications (collectively referred to as extended reality (XR) applications). Such low-latency applications may specify various latency, throughput, and timing requirements for wireless communication systems that provide connectivity for these applications. Thus, it is desirable to ensure that WLANs are able to meet the various latency, throughput, and timing requirements of such low-latency applications.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method can be performed by a wireless communication device to coordinate service periods (SPs) with an overlapping basic service set (OBSS). In some implementations, the method can include receiving first timing information indicating a timing of a first SP associated with an OBSS; transmitting, to one or more wireless stations (STAs), second timing information indicating the timing of the first SP, where the second timing information is associated with a first timing synchronization function (TSF) timer associated with the wireless communication device; and communicating with the one or more STAs, via a first wireless channel, associated with the second timing information.

Another innovative aspect of the subject matter described in this disclosure can be implemented in a wireless communication device. The wireless communication device can include a processing system and an interface configured to receive first timing information indicating a timing of a first SP associated with an OBSS; transmit, to one or more STAs, second timing information indicating the timing of the first SP, where the second timing information is associated with a first TSF timer associated with the wireless communication device; and communicate with the one or more STAs associated with the second timing information.

Another innovative aspect of the subject matter described in this disclosure can be implemented as a method of wireless communication. The method can be performed by a wireless communication device to coordinate SPs with an OBSS. In some implementations, the method can include synchronizing a local TSF timer with a first TSF timer associated with a basic service set (BSS); receive timing information indicating a timing of a first SP associated with an OBSS, where the timing information is associated with the first TSF timer; and communicate with one or more devices associated with the BSS and the received timing information.

Another innovative aspect of the subject matter described in this disclosure can be implemented in a wireless communication device. The wireless communication device can include a processing system configured to synchronize a local TSF timer with a first TSF timer associated with a BSS; and an interface configured to receive timing information indicating a timing of an SP associated with an OBSS, where the timing information is associated with the first TSF timer, and communicate with the one or more devices associated with the BSS and the received timing information.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 11 shows an illustrative flowchart depicting an example wireless communication operation.

Like reference numbers and designations in the various drawings indicate like elements.

DETAILED DESCRIPTION

Figure 1:
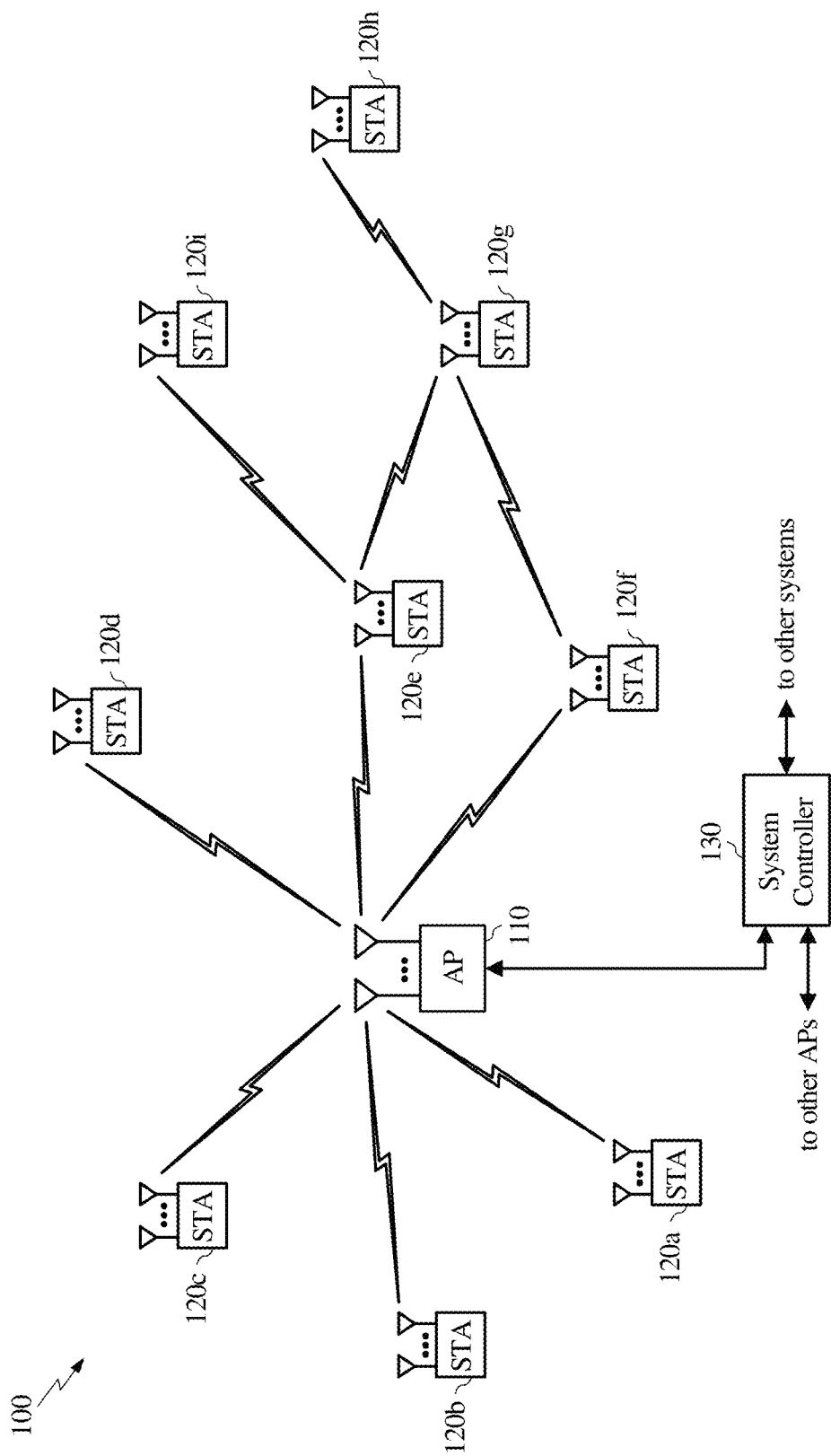
FIG. 1 shows a block diagram of an example wireless system.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Long Term Evolution (LTE), 3G, 4G or 5G (New Radio (NR)) standards promulgated by the 3rd Generation Partnership Project (3GPP), the Institute of Electrical and Electronics Engineers (IEEE) 802.11 standards, the IEEE 802.15 standards, or the Bluetooth® standards as defined by the Bluetooth Special Interest Group (SIG), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless wide area network (WWAN), a wireless personal area network (WPAN), a wireless local area network (WLAN), or an internet of things (IOT) network.

The IEEE 802.11be amendment of the IEEE 802.11 standard describes a restricted target wake time (r-TWT) service period (SP) that can be allocated for latency-sensitive traffic. As used herein, the term "non-legacy STA" refers to any wireless station (STA) that supports the IEEE 802.11be amendment, or future generations, of the IEEE 802.11 standard, while the term "low-latency STA" refers to any non-legacy STA that has latency-sensitive traffic to send or receive. In contrast, the term "legacy STA" may refer to any STA that only supports the IEEE 802.11ax, or earlier generations, of the IEEE 802.11 standard. Non-legacy STAs that support r-TWT operation and acquire transmit opportunities (TXOPs) outside of an r-TWT SP must terminate their respective TXOPs before the start of any r-TWT SP for which they are not a member. Further, an AP may suppress traffic from all legacy STAs during an r-TWT SP by scheduling a quiet interval to overlap with the r-TWT SP. As such, r-TWT SPs can provide more predictable latency, reduced worst case latency, or reduced jitter, with higher reliability for latency-sensitive traffic.

Aspects of the present disclosure recognize that overlapping basic service sets (OBSSs) exist in many wireless communication environments, particularly in dense or crowded environments. An OBSS is any basic service set (BSS) having an overlapping coverage area, and operating on the same wireless channel, as another BSS. As such, wireless communications in a given BSS may interfere or collide with wireless communications in an OBSS, resulting in increased latency of communications in the BSS, the OBSS, or both. Wireless communication devices (including access points (APs) and STAs) that operate in accordance with existing versions of the IEEE 802.11 standard (including an initial release (R1) of the IEEE 802.11be amendment) may not be aware of latency-sensitive traffic in an OBSS. Accordingly, new communication protocols and signaling are needed to prevent latency-sensitive traffic in a given BSS from interfering or colliding with latency sensitive-traffic in an OBSS.

Implementations of the subject matter described in this disclosure may be used to coordinate SPs among OBSSs. For example, an AP associated with a BSS may receive timing information indicating a scheduled SP (such as an r-TWT SP, a coordinated r-TWT SP, or a coordinated SP) associated with an OBSS. More specifically, the received timing information may indicate the timing of the SP in relation to a timing synchronization function (TSF) timer associated with the OBSS. In some aspects, the AP may transmit, to its associated STAs, coordinated timing information indicating the timing of the SP in relation to a TSF timer associated with the AP. In some implementations, the AP may adjust the timing information to account for an offset between the TSF timer associated with the AP and the TSF timer associated with the OBSS. In such implementations, the timing information received by the AP may be different than the coordinated timing information transmitted to its associated STAs. In some other implementations, the AP may synchronize its TSF timer with the TSF timer associated with the OBSS. In such implementations, the timing information received by the AP may be the same as the coordinated timing information transmitted to its associated STAs. In some aspects, the AP may communicate with its associated STAs based on the coordinated timing information. For example, the AP may schedule its communications with the STAs to be orthogonal (in time, frequency, or various other parameters) to communications in the OBSS during the SP.

Particular implementations of the subject matter described in this disclosure can be implemented to realize one or more of the following potential advantages. By coordinating SPs among OBSSs, aspects of the present disclosure may improve the latency gains achievable by latency-sensitive traffic through application of r-TWT SPs. As described herein, concurrent data transmissions in OBSSs may interfere or collide with one another, thereby increasing the latency of communications in such OBSSs. By scheduling communications between the AP and its associated STAs to be orthogonal to communications in the OBSSs during the SP, aspects of the present disclosure may prevent communications in the BSS from interfering or colliding with latency-sensitive communications in the OBSS. More specifically, aligning the coordinated timing information with the TSF timer of the AP allows the STAs associated with the AP to more accurately determine the timing of SPs associated with the OBSS. As a result, the STAs may avoid or otherwise honor any r-TWT SP schedules associated with the OBSS. Thus, with coordinated scheduling of SPs among OBSSs, r-TWT SP operation may provide even more predictable latency, reduced worst case latency, or reduced jitter, with higher reliability for latency-sensitive traffic in OBSSs.

FIG. 1 shows a block diagram of an example wireless system 100. The wireless system 100 is shown to include a wireless access point (AP) 110 and a number of wireless stations (STAs) 120a-120i. For simplicity, one AP 110 is shown in FIG. 1. The AP 110 may form a wireless local area network (WLAN) that allows the AP 110, the STAs 120a-120i, and other wireless devices (not shown for simplicity) to communicate with each other over a wireless medium.

The wireless medium, which may be divided into a number of channels or into a number of resource units (RUs), may facilitate wireless communications between the AP 110, the STAs 120a-120i, and other wireless devices connected to the WLAN. In some implementations, the STAs 120a-120i can communicate with each other using peer-to-peer communications (such as without the presence or involvement of the AP 110). The AP 110 may be assigned a unique MAC address that is programmed therein by, for example, the manufacturer of the access point. Similarly, each of the STAs 120a-120i also may be assigned a unique MAC address.

In some implementations, the wireless system 100 may correspond to a multiple-input multiple-output (MIMO) wireless network and may support single-user MIMO (SU-MIMO) and multi-user (MU-MIMO) communications. In some implementations, the wireless system 100 may support orthogonal frequency-division multiple access (OFDMA) communications. Further, although the WLAN is depicted in FIG. 1 as an infrastructure Basic Service Set (BSS), in some other implementations, the WLAN may be an Independent Basic Service Set (IBSS), an Extended Service Set (ESS), an ad-hoc network, or a peer-to-peer (P2P) network (such as operating according to one or more Wi-Fi Direct protocols).

The STAs 120a-120i may be any suitable Wi-Fi enabled wireless devices including, for example, cell phones, personal digital assistants (PDAs), tablet devices, laptop computers, or the like. The STAs 120a-120i also may be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The AP 110 may be any suitable device that allows one or more wireless devices (such as the STAs 120a-120i) to connect to another network (such as a local area network (LAN), wide area network (WAN), metropolitan area network (MAN), or the Internet). In some implementations, a system controller 130 may facilitate communications between the AP 110 and other networks or systems. In some implementations, the system controller 130 may facilitate communications between the AP 110 and one or more other APs (not shown for simplicity) that may be associated with other wireless networks. In addition, or in the alternative, the AP 110 may exchange signals and information with one or more other APs using wireless communications.

The AP 110 may periodically broadcast beacon frames to enable the STAs 120a-120i and other wireless devices within wireless range of the AP 110 to establish and maintain a communication link with the AP 110. The beacon frames, which may indicate downlink (DL) data transmissions to the STAs 120a-120i and solicit or schedule uplink (UL) data transmissions from the STAs 120a-120i, are typically broadcast according to a target beacon transmission time (TBTT) schedule. The broadcasted beacon frames may include a timing synchronization function (TSF) value of the AP 110. The STAs 120a-120i may synchronize their own local TSF values with the broadcasted TSF value, for example, so that all of the STAs 120a-120i are synchronized with each other and with the AP 110.

In some implementations, each of the stations STAs 120a-120i and the AP 110 may include one or more transceivers, one or more processing resources (such as processors or Application-Specific Integrated Circuits (ASICs)), one or more memory resources, and a power source (such as a battery). The one or more transceivers may include Wi-Fi transceivers, Bluetooth transceivers, cellular transceivers, or other suitable radio frequency (RF) transceivers (not shown for simplicity) to transmit and receive wireless communication signals. In some implementations, each transceiver may communicate with other wireless devices in distinct frequency bands or using distinct communication protocols. The memory resources may include a non-transitory computer-readable medium (such as one or more nonvolatile memory elements, such as EPROM, EEPROM, Flash memory, a hard drive, etc.) that stores instructions for performing one or more operations described with respect to FIGS. 5-11.

Figure 2:
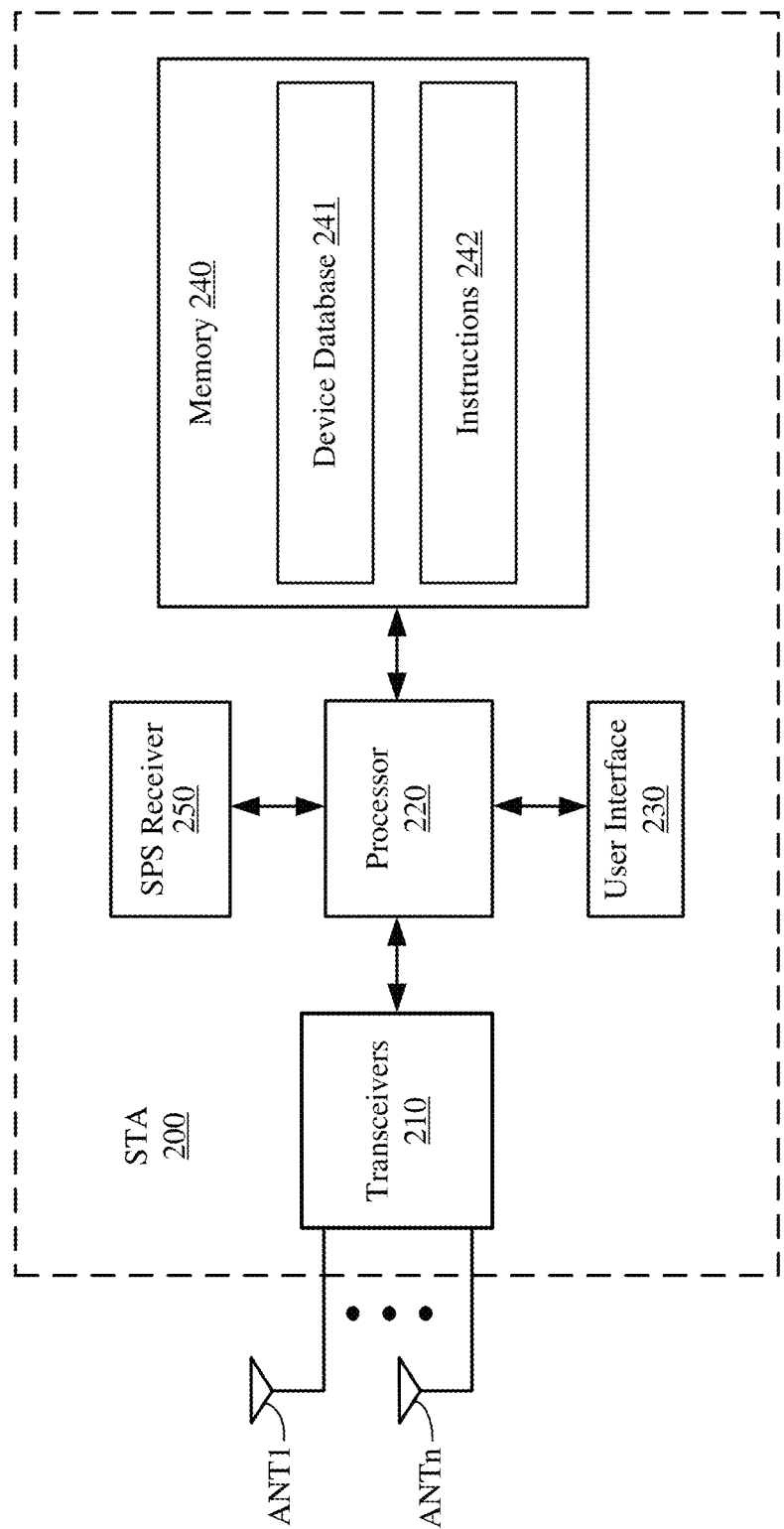
FIG. 2 shows a block diagram of an example wireless station (STA).

FIG. 2 shows an example wireless station (STA) 200. The STA 200 may be one implementation of at least one of the STAs 120a-120i of FIG. 1. The STA 200 may include one or more transceivers 210, a processor 220, a user interface 230, a memory 240, and a number of antennas ANT1-ANTn. The transceivers 210 may be coupled to antennas ANT1-ANTn, either directly or through an antenna selection circuit (not shown for simplicity). The transceivers 210 may be used to transmit signals to and receive signals from other wireless devices including, for example, a number of APs and a number of other STAs. Although not shown in FIG. 2 for simplicity, the transceivers 210 may include any number of transmit chains to process and transmit signals to other wireless devices via antennas ANT1-ANTn, and may include any number of receive chains to process signals received from antennas ANT1-ANTn. Thus, the STA 200 may be configured for MIMO communications and OFDMA communications. The MIMO communications may include SU-MIMO communications and MU-MIMO communications. In some implementations, the STA 200 may use multiple antennas ANT1-ANTn to provide antenna diversity. Antenna diversity may include polarization diversity, pattern diversity, and spatial diversity.

The processor 220 may be any suitable one or more processors capable of executing scripts or instructions of one or more software programs stored in the STA 200 (such as within the memory 240). In some implementations, the processor 220 may be or include one or more microprocessors providing the processor functionality and external memory providing at least a portion of machine-readable media. In other implementations, the processor 220 may be or include an Application Specific Integrated Circuit (ASIC) with the processor, the bus interface, the user interface, and at least a portion of the machine-readable media integrated into a single chip. In some other implementations, the processor 220 may be or include one or more Field Programmable Gate Arrays (FPGAs) or Programmable Logic Devices (PLDs).

In some implementations, the processor 220 may be a component of a processing system. A processing system may generally refer to a system or series of machines or components that receives inputs and processes the inputs to produce a set of outputs (which may be passed to other systems or components of, for example, the STA 200). For example, a processing system of the STA 200 may refer to a system including the various other components or subcomponents of the STA 200.

The processing system of the STA 200 may interface with other components of the STA 200, and may process information received from other components (such as inputs or signals), output information to other components, and the like. For example, a chip or modem of the STA 200 may be coupled to or include a processing system, a first interface to output information, and a second interface to obtain information. In some instances, the first interface may refer to an interface between the processing system of the chip or modem and a transmitter, such that the STA 200 may transmit information output from the chip or modem. In some instances, the second interface may refer to an interface between the processing system of the chip or modem and a receiver, such that the STA 200 may obtain information or signal inputs, and the information may be passed to the processing system. A person having ordinary skill in the art will readily recognize that the first interface also may obtain information or signal inputs, and the second interface also may output information or signal outputs.

The user interface 230, which is coupled to the processor 220, may be or represent a number of suitable user input devices such as, for example, a speaker, a microphone, a display device, a keyboard, a touch screen, and so on. In some implementations, the user interface 230 may allow a user to control a number of operations of the STA 200, to interact with one or more applications executable by the STA 200, and other suitable functions.

In some implementations, the STA 200 may include a satellite positioning system (SPS) receiver 250. The SPS receiver 250, which is coupled to the processor 220, may be used to acquire and receive signals transmitted from one or more satellites or satellite systems via an antenna (not shown for simplicity). Signals received by the SPS receiver 250 may be used to determine (or at least assist with the determination of) a location of the STA 200.

The memory 240 may include a device database 241 that may store location data, configuration information, data rates, a medium access control (MAC) address, timing information, modulation and coding schemes (MCSs), traffic indication (TID) queue sizes, ranging capabilities, and other suitable information about (or pertaining to) the STA 200. The device database 241 also may store profile information for a number of other wireless devices. The profile information for a given wireless device may include, for example, a service set identification (SSID) for the wireless device, a Basic Service Set Identifier (BSSID), operating channels, TSF values, beacon intervals, ranging schedules, channel state information (CSI), received signal strength indicator (RSSI) values, goodput values, and connection history with the STA 200. In some implementations, the profile information for a given wireless device also may include clock offset values, carrier frequency offset values, and ranging capabilities.

The memory 240 also may be or include a non-transitory computer-readable storage medium (such as one or more nonvolatile memory elements, such as EPROM, EEPROM, Flash memory, a hard drive, and so on) that may store computer-executable instructions 242 to perform all or a portion of one or more operations described in this disclosure.

Figure 3:
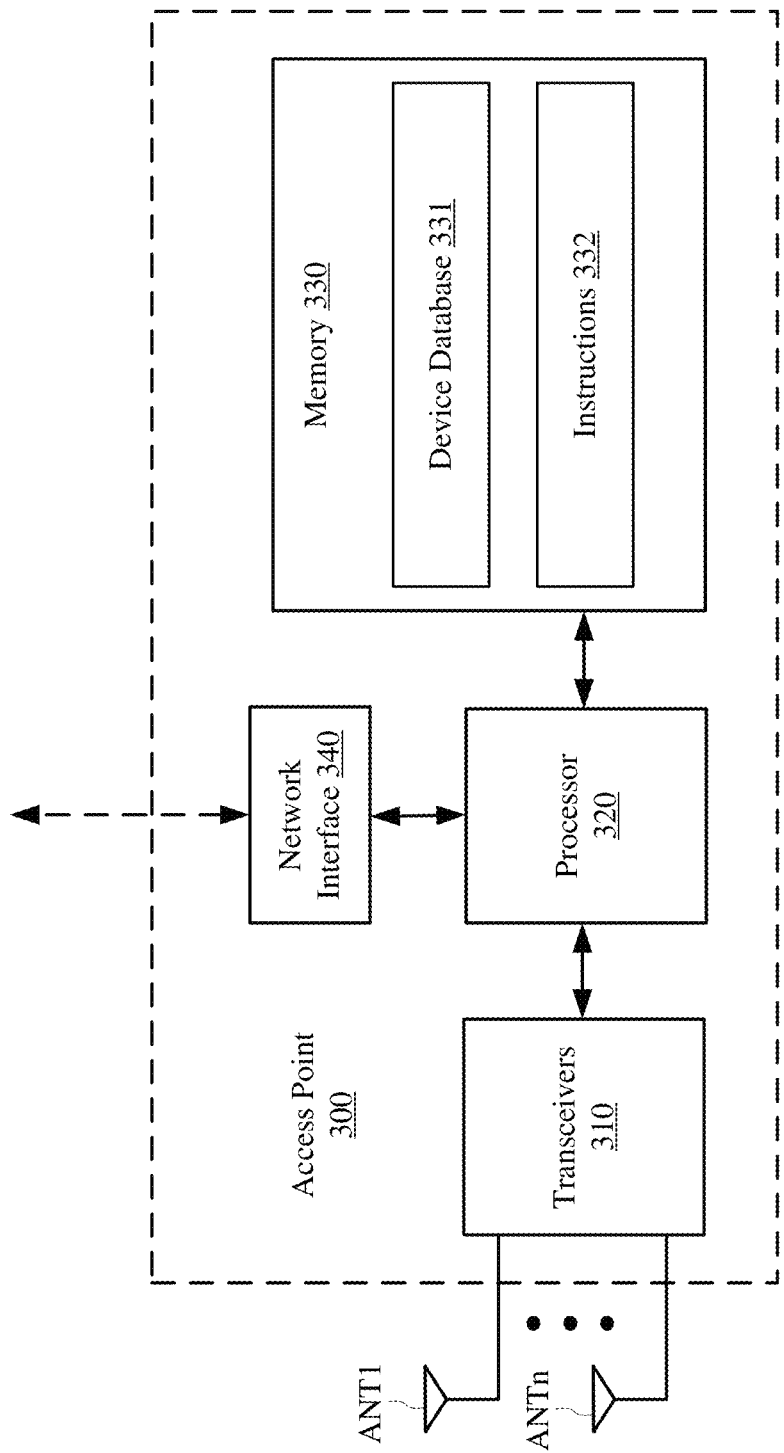
FIG. 3 shows a block diagram of an example access point (AP).

FIG. 3 shows an example access point (AP) 300. The AP 300 may be one implementation of the AP 110 of FIG. 1. The AP 300 may include one or more transceivers 310, a processor 320, a memory 330, a network interface 340, and a number of antennas ANT1-ANTn. The transceivers 310 may be coupled to the antennas ANT1-ANTn, either directly or through an antenna selection circuit (not shown for simplicity). The transceivers 310 may be used to transmit signals to and receive signals from other wireless devices including, for example, one or more of the STAs 120a-120i of FIG. 1 and other APs. Although not shown in FIG. 3 for simplicity, the transceivers 310 may include any number of transmit chains to process and transmit signals to other wireless devices via the antennas ANT1-ANTn, and may include any number of receive chains to process signals received from the antennas ANT1-ANTn. Thus, the AP 300 may be configured for MIMO communications and OFDMA communications. The MIMO communications may include SU-MIMO communications and MU-MIMO communications. In some implementations, the AP 300 may use multiple antennas ANT1-ANTn to provide antenna diversity. Antenna diversity may include polarization diversity, pattern diversity, and spatial diversity.

In high frequency (such as 60 GHz or millimeter wave (mmWave)) wireless communication systems (such as conforming to the IEEE 802.11ad or 802.11ay amendments of the IEEE 802.11 standard), communications may be beamformed using phased array antennas at the transmitter and the receiver. Beamforming generally refers to a wireless communication technique by which the transmitting device and the receiving device adjust transmit or receive antenna settings to achieve a desired link budget for subsequent communications. The procedure to adapt the transmit and receive antennas, referred to as beamforming training, may be performed initially to establish a link between the transmitting and receiving devices and also may be performed periodically to maintain a quality link using optimized transmit and receive beams.

The processor 320 may be any suitable one or more processors capable of executing scripts or instructions of one or more software programs stored in the AP 300 (such as within the memory 330). In some implementations, the processor 320 may be or include one or more microprocessors providing the processor functionality and external memory providing at least a portion of machine-readable media. In other implementations, the processor 320 may be or include an ASIC with the processor, the bus interface, the user interface, and at least a portion of the machine-readable media integrated into a single chip. In some other implementations, the processor 320 may be or include one or more FPGAs or PLDs. In some implementations, the processor 320 may be a component of a processing system. For example, a processing system of the AP 300 may refer to a system including the various other components or subcomponents of the AP 300.

The processing system of the AP 300 may interface with other components of the AP 300, and may process information received from other components (such as inputs or signals), output information to other components, and the like. For example, a chip or modem of the AP 300 may include a processing system, a first interface to output information, and a second interface to obtain information. In some instances, the first interface may refer to an interface between the processing system of the chip or modem and a transmitter, such that the AP 300 may transmit information output from the chip or modem. In some instances, the second interface may refer to an interface between the processing system of the chip or modem and a receiver, such that the AP 300 may obtain information or signal inputs, and the information may be passed to the processing system. A person having ordinary skill in the art will readily recognize that the first interface also may obtain information or signal inputs, and the second interface also may output information or signal outputs.

The network interface 340, which is coupled to the processor 320, may be used to communicate with the system controller 130 of FIG. 1. The network interface 340 also may allow the AP 300 to communicate, either directly or via one or more intervening networks, with other wireless systems, with other APs, with one or more back-haul networks, or any combination thereof.

The memory 330 may include a device database 331 that may store location data, configuration information, data rates, the MAC address, timing information, MCSs, ranging capabilities, and other suitable information about (or pertaining to) the AP 300. The device database 331 also may store profile information for a number of other wireless devices (such as one or more of the stations 120a-120i of FIG. 1). The profile information for a given wireless device may include, for example, an SSID for the wireless device, a BSSID, operating channels, CSI, received signal strength indicator (RSSI) values, goodput values, and connection history with the AP 300. In some implementations, the profile information for a given wireless device also may include TID queue sizes, a preferred packet duration for trigger-based UL transmissions, and a maximum amount of queued UL data that the wireless device is able to insert into TB PPBUs.

The memory 330 also may be or include a non-transitory computer-readable storage medium (such as one or more nonvolatile memory elements, such as EPROM, EEPROM, Flash memory, a hard drive, and so on) that may store computer-executable instructions 332 to perform all or a portion of one or more operations described in this disclosure.

Figure 4:
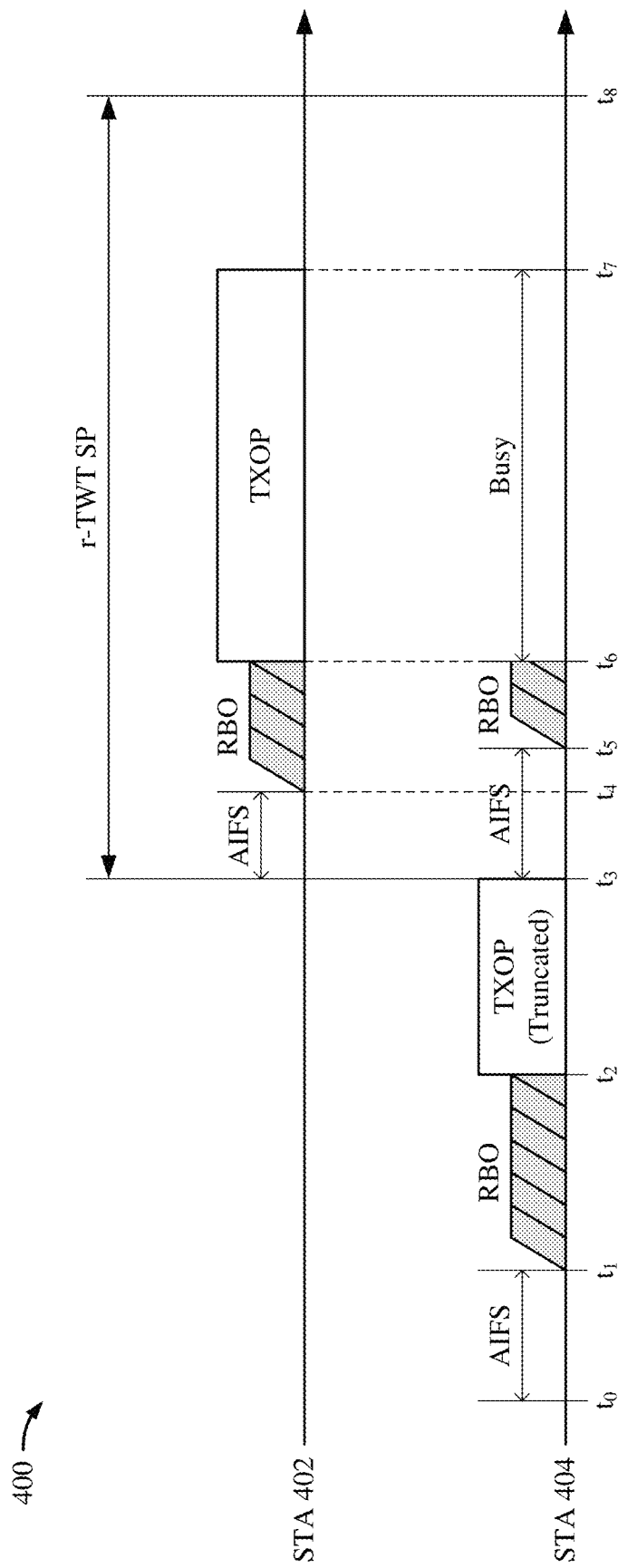
FIG. 4 shows a timing diagram depicting an example of wireless communication among devices belonging to a basic service set (BSS).

FIG. 4 shows a timing diagram 400 depicting an example of wireless communication among devices belonging to a BSS. In the example of FIG. 4, the BSS may include multiple non-legacy STAs 402 and 404 that support r-TWT operation. More specifically, the STA 402 may be a low-latency STA that is a member of an r-TWT SP, which spans a duration from times $t_3$ to $t_8$, whereas the STA 404 may be a non-member STA. In some implementations, each of the STAs 402 and 404 may be one example of any of the STAs 120a-120i of FIG. 1 or the STA 200 of FIG. 2. Although only two non-legacy STAs 402 and 404 are shown in the example of FIG. 4, in actual implementations the BSS may include any number of legacy or non-legacy STAs.

The non-member STA 404 attempts to access a shared wireless channel prior to the start of the r-TWT SP. More specifically, the non-member STA 404 senses that the channel is idle for a threshold duration, from times $t_0$ to $t_1$, based on a channel sensing operation (such as clear channel assessment (CCA)) and further counts down a random backoff (RBO) duration, from times $t_1$ to $t_2$, before attempting to acquire a TXOP. For example, the threshold duration (from times $t_0$ to $t_1$) may be an arbitration interframe spacing (AIFS) duration associated with a particular access category (AC) of data traffic. Accordingly, the RBO duration (from times $t_1$ to $t_2$) may be randomly selected from a range of RBOs spanning a contention window associated with the AC. At time $t_2$, the non-member STA 404 senses that the wireless channel is still idle and proceeds to acquire a TXOP, for example, by initiating a transmission over the shared channel. In the example of FIG. 4, the desired TXOP may be longer than the duration remaining before the start of the r-TWT SP at time $t_3$. However, because the existing rules regarding r-TWT operation require non-member STAs to terminate their TXOPs by the start of an r-TWT SP, the non-member STA 404 must truncate its TXOP between times $t_2$ to $t_3$.

The low-latency STA 402 attempts to access the shared wireless channel at the start of the r-TWT SP. In the example of FIG. 4, the low-latency STA 402 senses that the channel is idle for an AIFS duration, from times $t_3$ to $t_4$, and further counts down an RBO duration, from times $t_4$ to $t_6$, before attempting to acquire a TXOP. As shown in FIG. 4, the non-member STA 404 also attempts to access the shared wireless channel at the start of the r-TWT SP. For example, the non-member STA 404 senses that the channel is idle for an AIFS duration, from times $t_3$ to $t_5$, and further counts down an RBO duration beginning at time $t_5$. In some implementations, the data traffic associated with the low-latency STA 402 may be assigned to a higher-priority AC than the data traffic associated with the non-member STA 404. As such, the AIFS or RBO durations associated with the low-latency STA 402 may be shorter than the AIFS or RBO durations, respectively, associated with the non-member STA 404. As a result, the low-latency STA 402 wins access to the wireless channel, at time $t_6$, and acquires a TXOP, for example, by initiating a transmission over the shared channel.

The non-member STA 404 senses that the wireless channel is busy, at time $t_6$, and refrains from accessing the shared channel for the duration of the TXOP (from times $t_6$ to $t_7$). After the TXOP has terminated, at time $t_7$, the non-member STA 404 may once again attempt to access the wireless channel. In this manner, the r-TWT operation may prioritize latency-sensitive traffic in the BSS, for example, by requiring non-member STAs to terminate their TXOPs by the start of any r-TWT SPs of which they are not members. Additionally, an AP (not shown for simplicity) may suppress all traffic from legacy STAs associated with the BSS by scheduling a quiet interval to overlap with at least a portion of the r-TWT SP (such as one or more time-units (TUs) beginning at time $t_3$). For example, the duration of the quiet interval may be indicated by one or more quiet elements included in management frames (such as beacon frames or probe response frames) transmitted by the AP prior to the start of the r-TWT SP.

Figure 5:
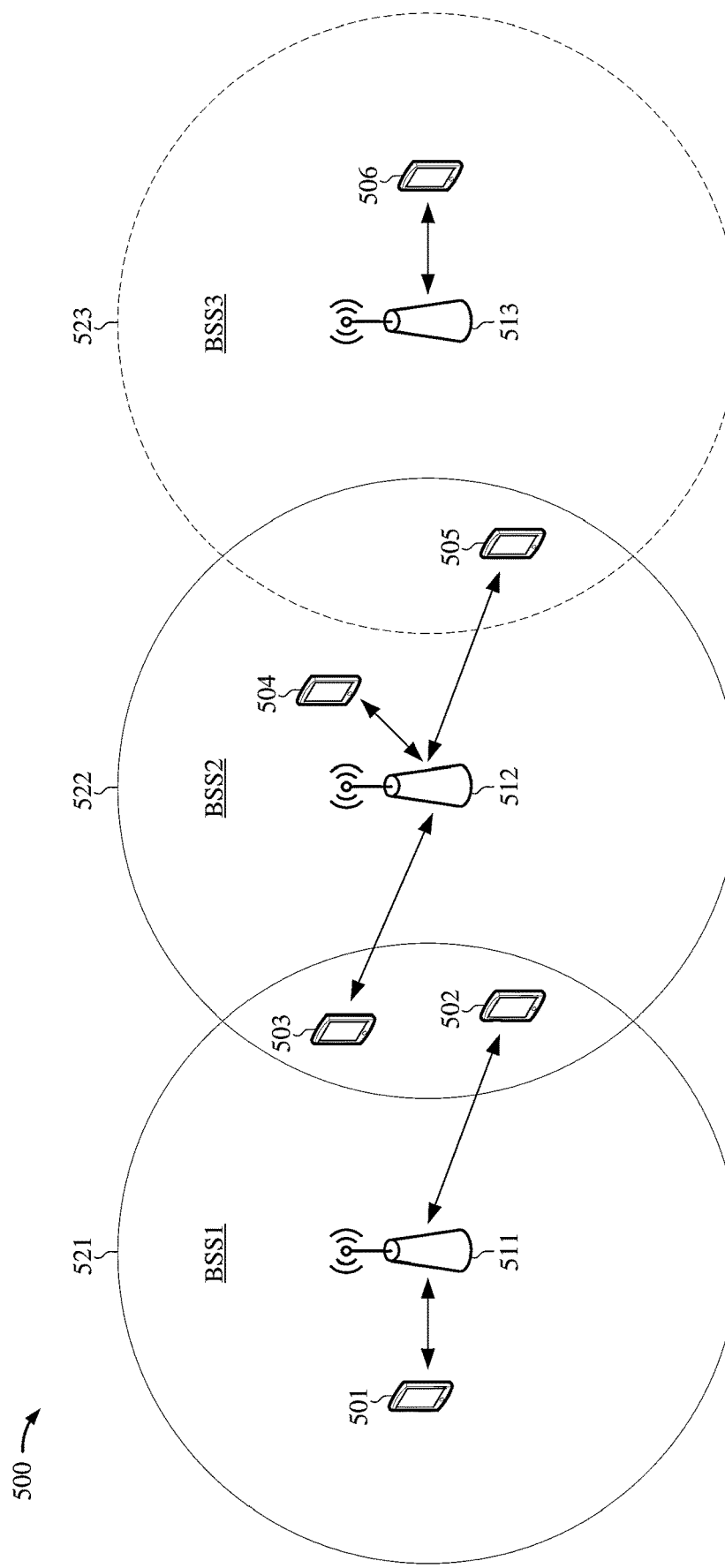
FIG. 5 shows an example communication environment that includes overlapping basic service sets (OBSSs).

FIG. 5 shows an example communication environment 500 that includes OBSSs. More specifically, the example communication environment 500 includes a number of STAs 501-506 and a number of APs 511-513. In some implementations, each of the STAs 501-506 may be one example of any of the STAs 120a-120i of FIG. 1 or the STA 200 of FIG. 2. In some implementations, each of the APs 511-513 may be one example of any of the APs 110 or 300 of FIGS. 1 and 3, respectively. The APs 511-513 may represent BSSs (BSS1-BSS3) having coverage areas 521-523, respectively.

As shown in FIG. 5, the STAs 501 and 502 are associated with the AP 511 (or BSS1) and located within the coverage area 521, the STAs 503-505 are associated with the AP 512 (or BSS2) and located within the coverage area 522, and the STA 506 is associated with the AP 513 (or BSS3) and located within the coverage area 523. In the example of FIG. 5, each of the APs 511-513 may be configured to operate on the same wireless channel. Further, the APs 511 and 512 have overlapping coverage areas 521 and 522, respectively. Thus, the APs 511 and 512 represent OBSSs. Similarly, the APs 512 and 513 have overlapping coverage areas 522 and 523, respectively. Thus, the APs 512 and 513 represent OBSSs.

In some aspects, each of the STAs 501-506 and each of the APs 511-513 may support r-TWT operation. More specifically, the AP 511 may schedule one or more r-TWT SPs that can be used by its associated STAs 501 and 502 to communicate latency-sensitive traffic, the AP 512 may schedule one or more r-TWT SPs that can be used by its associated STAs 503-505 to communicate latency-sensitive traffic, and the AP 513 may schedule one or more r-TWT SPs that can be used by its associated STA 506 to communicate latency-sensitive traffic. Because BSS2 overlaps with BSS1 and BSS3, wireless communications in BSS2 can interfere or collide with wireless communications in any of BSS1 or BSS3. Similarly, wireless communications in any of BSS1 or BSS3 can interfere or collide with wireless communications in BSS2.

In some aspects, the APs 511 and 512 may coordinate the scheduling of their respective r-TWT SPs to avoid interference or collisions between latency-sensitive data traffic in BSS1 and latency-sensitive data traffic in BSS2. As such, the APs 511 and 512 may be referred to herein as "r-TWT coordinating APs." In some implementations, the APs 511 and 512 may schedule their respective r-TWT SPs to be orthogonal in time. For example, the AP 511 may schedule one or more r-TWT SPs to occur during periods of time that do not overlap with any r-TWT SPs scheduled by the AP 512. Similarly, the AP 512 may schedule one or more r-TWT SPs to occur during periods of time that do not overlap with any r-TWT SPs scheduled by the AP 511. In some other implementations, the APs 511 and 512 may schedule their r-TWT SPs to overlap in time, while allocating coordinated resources to concurrent or overlapping latency-sensitive traffic in BSS1 and BSS2 (such as using one or more multi-AP coordination techniques). For example, within the same or overlapping r-TWT SPs, latency-sensitive traffic may be transmitted at a relatively low power or on different time or frequency resources across BSS1 and BSS2.

In some aspects, the coordinated r-TWT SPs may be scheduled by a central coordinator. For example, the central coordinator may schedule r-TWT SPs for each of the APs 511 and 512 and may communicate the r-TWT SP schedules to the APs 511 and 512 via coordinated r-TWT signaling. In some implementations, the central coordinator may be an AP such as, for example, one of the APs 511 or 512. In some other implementations, the central coordinator may be a network controller that communicates with the APs 511 and 512 via a (wired or wireless) backhaul. In some other aspects, the coordinated r-TWT SPs may be scheduled in a distributed manner. For example, the AP 511 may communicate its r-TWT SP schedule to the AP 512, and the AP 512 may schedule its r-TWT SPs based on the r-TWT SP schedule of the AP 511. In some implementations, the AP 511 may "explicitly" signal its r-TWT SP schedule to the AP 512 via a wired backhaul or in one or more packets transmitted to (or intended for reception by) the AP 512. In some other implementations, the AP 511 may "implicitly" signal its r-TWT SP schedule to the AP 512. In such implementations, the AP 512 may acquire the r-TWT SP schedule of the AP 511 by intercepting one or more packets transmitted by the AP 511 to its associated STAs (such as the STAs 501 or 502).

In some implementations, each of the r-TWT coordinating APs 511 and 512 may transmit or broadcast coordinated r-TWT signaling information to other APs or STAs in its vicinity. For example, the AP 511 may broadcast its r-TWT SP schedule as well as the r-TWT SP schedule of the AP 512 to its associated STAs 501 and 502 and to any other APs within wireless communication range. Accordingly, the STAs 501 and 502 (and other APs) may schedule their latency-sensitive communications to coincide with the r-TWT SPs of the AP 511 while avoiding access to the wireless channel during the r-TWT SPs of the AP 512. In some implementations, the AP 511 may further schedule quiet intervals to overlap with the r-TWT SPs of the AP 512, for example, to prevent legacy STAs from interfering with latency-sensitive communications in BSS2. Similarly, the AP 512 may broadcast its r-TWT SP schedule as well as the r-TWT SP schedule of the AP 511 to its associated STAs 503-505 and to any other APs within wireless communication range. Accordingly, the STAs 503-505 may schedule their latency-sensitive communications to coincide with the r-TWT SPs of the AP 512 while avoiding access to the wireless channel during the r-TWT SPs of the AP 511. In some implementations, the AP 512 may further schedule quiet intervals to overlap with the r-TWT SPs of the AP 511, for example, to prevent legacy STAs from interfering with latency-sensitive communications in BSS1.

In some aspects, the AP 513 may not coordinate the scheduling of its r-TWT SPs with the AP 512 (or may not support coordinated r-TWT scheduling). As such, the AP 513 may be referred to herein as an "r-TWT non-coordinating AP." In some implementations, the AP 512 may acquire the r-TWT SP schedule of the AP 513 by intercepting beacon frames, management frames, or other packets transmitted by the AP 513 to its associated STAs (such as the STA 506). Accordingly, the AP 512 may schedule its r-TWT SPs based on the r-TWT SP schedule of the AP 513. In some implementations, the AP 512 may schedule its r-TWT SPs to be orthogonal in time to (or otherwise avoid) any r-TWT SPs scheduled by the AP 513. In some other implementations, the AP 512 may utilize other information associated with the AP 513, in addition to the r-TWT SP schedule of the AP 513, in scheduling its own r-TWT SPs. For example, the AP 512 may assess a level of interference from the AP 513 based on a received signal strength indication (RSSI) of wireless signals received from the AP 513 and may adjust the transmit power or timing of latency-sensitive traffic in BSS2 to avoid interference or collisions with latency-sensitive traffic in BSS3.

In some other aspects, the AP 513 may be hidden from (or otherwise undetectable by) the AP 512. In some implementations, the AP 512 may acquire the r-TWT SP schedule of the AP 513 from one or more associated STAs located within the coverage area 523 of the AP 513 (such as the STA 505). For example, the STA 505 may intercept one or more beacon frames, management frames, or other packets transmitted by the AP 513 to its associated STAs (such as the STA 506). The STA 505 may parse the intercepted packets for r-TWT schedule information indicating the r-TWT SP schedule of the AP 513 and relay the r-TWT SP schedule to the AP 512. Accordingly, the AP 512 may schedule its r-TWT SPs based on the r-TWT SP schedule of the AP 513. In some implementations, the AP 512 may schedule its r-TWT SPs to be orthogonal in time to (or otherwise avoid) any r-TWT SPs scheduled by the AP 513. In some other implementations, the AP 512 may utilize other information associated with the AP 513 (such as an RSSI of wireless signals received from the AP 513), in addition to the r-TWT SP schedule of the AP 513, in scheduling its own r-TWT SPs. For example, the AP 512 may adjust the transmit power or timing of latency-sensitive traffic in BSS2 to avoid interference or collisions with latency-sensitive traffic in BSS3.

Figure 6:
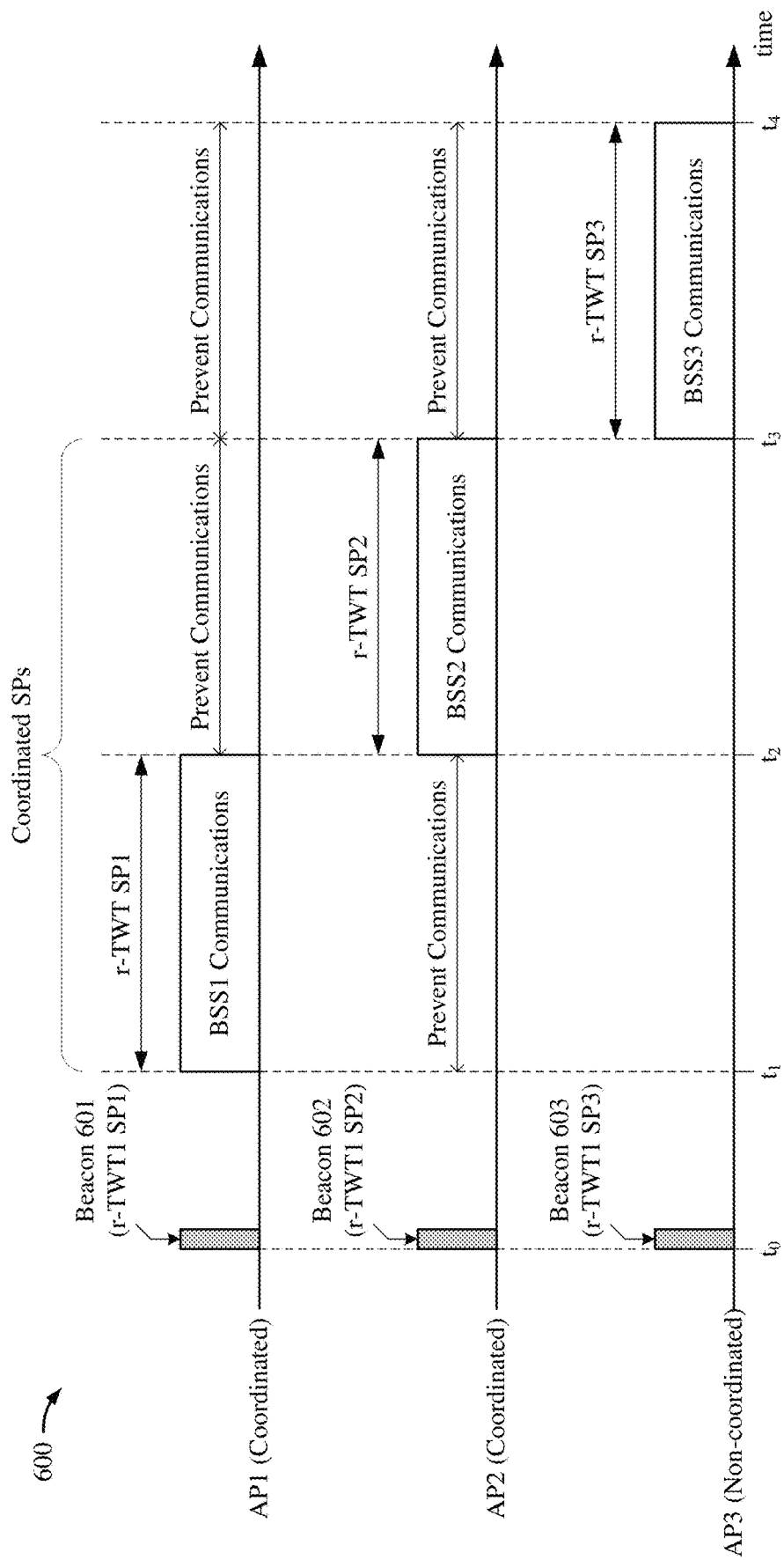
FIG. 6 shows a timing diagram depicting an example of wireless communication among devices associated with OBSSs.

FIG. 6 shows a timing diagram 600 depicting an example of wireless communication among devices associated with OBSSs (BSS1-BSS3). In the example of FIG. 6, BSS1, BSS2, and BSS3 are represented by access points AP1, AP2, and AP3, respectively. In some implementations, the access points AP1, AP2, and AP3 may be examples of the APs 511, 512, and 513, respectively, of FIG. 5. As shown in FIG. 6, the access points AP1 and AP2 belong to a coordinated r-TWT scheduling group. As such, the access points AP1 and AP2 may schedule their r-TWT SPs in a coordinated manner so that latency-sensitive data traffic in BSS1 does not interfere or collide with latency-sensitive data traffic in BSS2. In contrast, the access point AP3 does not belong to the coordinated r-TWT scheduling group. As such, the access point AP3 does not schedule its r-TWT SPs in a coordinated manner with any of the access points AP1 or AP2.

In some implementations, the access points AP1 and AP2 may schedule their r-TWT SPs to be orthogonal in time while avoiding any r-TWT SPs scheduled by the access point AP3. As shown in FIG. 6, the access point AP3 schedules an r-TWT SP (r-TWT SP3) to occur from times $t_3$ to $t_4$. Accordingly, the access points AP1 and AP2 may avoid scheduling any of their r-TWT SPs to occur between times $t_3$ and $t_4$. In the example of FIG. 6, the access point AP1 schedules an r-TWT SP (r-TWT SP1) to occur from times $t_1$ to $t_2$ and the access point AP2 schedules an r-TWT SP (r-TWT SP2) to occur from times $t_2$ to $t_3$. In some implementations, each of the service periods r-TWT SP1, r-TWT SP2, and r-TWT SP3 may be one example of the r-TWT SP shown in FIG. 4 (from times $t_3$ to $t_8$). Accordingly, the first access point AP1 may communicate latency-sensitive data with one or more low-latency STAs in BSS1 during r-TWT SP1, the second access point AP2 may communicate latency-sensitive data with one or more low-latency STAs in BSS2 during r-TWT SP2, and the third access point AP3 may communicate latency-sensitive data with one or more low-latency STAs in BSS3 during r-TWT SP3.

Aspects of the present disclosure recognize that STAs located at the edge of an AP's coverage area (such as the STAs 502, 503 and 505 of FIG. 5) are more susceptible to interference from an OBSS than STAs located closer to the AP. Thus, allocating such STAs to r-TWT SPs that are orthogonal in time may significantly improve the quality of their latency-sensitive data communications compared to other means of coordinated r-TWT scheduling. In some aspects, each of the access points AP1, AP2, and AP3 may assign or otherwise allocate low-latency STAs to the service periods r-TWT SP1, r-TWT SP2, and r-TWT SP3, respectively, based on r-TWT schedule information carried in beacon or other management frames transmitted prior to (or during) one or more r-TWT SPs. In some implementations, the r-TWT schedule information associated with a particular r-TWT SP may assign one or more STAs to that r-TWT SP. In some other implementations, a STA may request to join a particular r-TWT SP responsive to receiving r-TWT schedule information associated with that r-TWT SP.

As shown in FIG. 6, the access point AP1 transmits a beacon frame 601, at time $t_0$, carrying r-TWT schedule information indicating the schedule associated with r-TWT SP1. With reference for example to FIG. 5, the beacon frame 601 may be transmitted by the AP 511 and may assign or otherwise allocate the STA 502 to r-TWT SP1. The access point AP2 transmits a beacon frame 602, at time $t_0$, carrying r-TWT schedule information indicating the schedule associated with r-TWT SP2. With reference for example to FIG. 5, the beacon frame 602 may be transmitted by the AP 512 and may assign or otherwise allocate one or more of the STAs 503 or 505 to r-TWT SP2. The access point AP3 transmits a beacon frame 603, at time $t_0$, carrying r-TWT schedule information indicating the schedule associated with r-TWT SP3. With reference for example to FIG. 5, the beacon frame 603 may assign or otherwise allocate the STA 506 to r-TWT SP3. Although FIG. 6 shows the beacon frames 601-603 being transmitted at the same time (to), in some other implementations, one or more of the beacon frames 601-603 may be transmitted at a different time.

In some implementations, the beacon frames 601 and 602 broadcast by the coordinated access points AP1 and AP2, respectively, may further carry coordinated r-TWT signaling information. As described herein, the coordinated r-TWT signaling information may indicate the r-TWT SP schedules associated with one or more OBSSs. For example, the beacon frame 601 may carry coordinated r-TWT signaling information indicating the schedules for one or more of the service periods r-TWT SP2 or r-TWT SP3 and the beacon frame 602 may carry coordinated r-TWT signaling information indicating the schedules for one or more of the service periods r-TWT SP1 or r-TWT SP3. As used herein, the term "schedule" may include timing information, resource allocation information, or various other communication parameters associated with an r-TWT SP. For example, the schedule for r-TWT SP1 may indicate that r-TWT SP1 is to occur from times $t_1$ to $t_2$, the schedule for r-TWT SP2 may indicate that r-TWT SP2 is to occur from times $t_2$ to $t_3$, and the schedule for r-TWT SP3 may indicate that r-TWT SP3 is to occur from times $t_3$ to $t_4$.

In some implementations, STAs associated with the access point AP1 (or BSS1) may avoid accessing the wireless channel or otherwise interfering with latency-sensitive communications in BSS2 and BSS3 during the service periods r-TWT SP2 and r-TWT SP3, respectively, based on the coordinated r-TWT signaling information received from the access point AP1. In some other implementations, the access point AP1 may schedule one or more quiet intervals to overlap with the service periods r-TWT SP2 and r-TWT SP3, for example, to prevent legacy STAs associated with the access point AP1 (or BSS1) from accessing the wireless channel or otherwise interfering with latency-sensitive communications in BSS2 and BSS3, respectively, during such times. In some implementations, STAs associated with the access point AP2 (or BSS2) may avoid accessing the wireless channel or otherwise interfering with latency-sensitive communications in BSS1 and BSS3 during the service periods r-TWT SP1 and r-TWT SP3, respectively, based on the coordinated r-TWT signaling information received from the access point AP2. In some other implementations, the access point AP2 may schedule one or more quiet intervals to overlap with the service periods r-TWT SP1 and r-TWT SP3, for example, to prevent legacy STAs associated with the access point AP2 (or BSS2) from accessing the wireless channel or otherwise interfering with latency-sensitive communications in BSS1 and BSS3, respectively, during such times.

Figure 7:
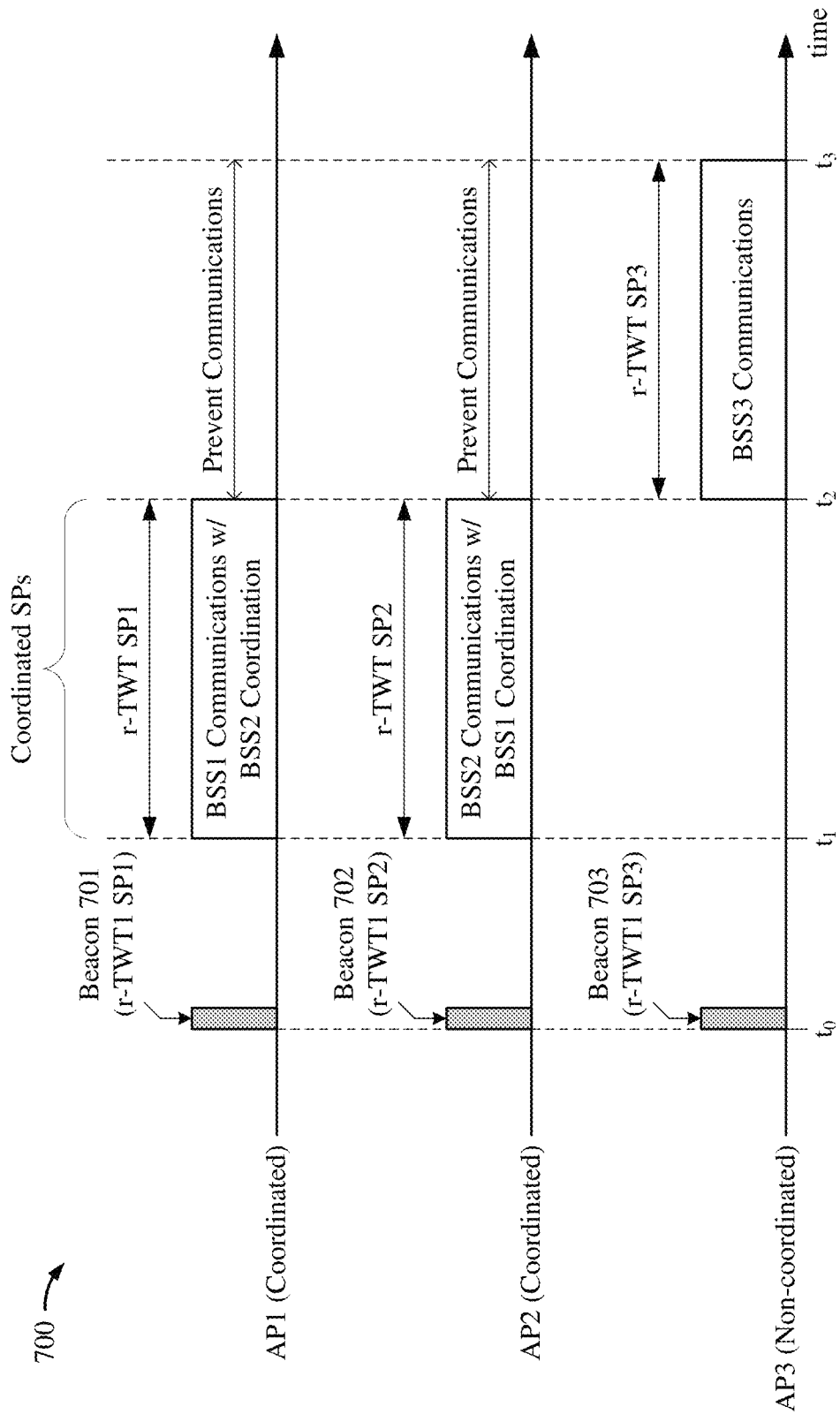
FIG. 7 shows a timing diagram depicting an example of wireless communication among devices associated with OBSSs.

FIG. 7 shows a timing diagram 700 depicting an example of wireless communication among devices associated with OBSSs (BSS1-BSS3). In the example of FIG. 7, BSS1, BSS2, and BSS3 are represented by access points AP1, AP2, and AP3, respectively. In some implementations, the access points AP1, AP2, and AP3 may be examples of the APs 511, 512, and 513, respectively, of FIG. 5. As shown in FIG. 7, the access points AP1 and AP2 belong to a coordinated r-TWT scheduling group. As such, the access points AP1 and AP2 may schedule their r-TWT SPs in a coordinated manner so that latency-sensitive data traffic in BSS1 does not interfere or collide with latency-sensitive data traffic in BSS2. In contrast, the access point AP3 does not belong to the coordinated r-TWT scheduling group. As such, the access point AP3 does not schedule its r-TWT SPs in a coordinated manner with any of the access points AP1 or AP2.

In some implementations, the access points AP1 and AP2 may schedule their r-TWT SPs to overlap in time while avoiding any r-TWT SPs scheduled by the access point AP3. As shown in FIG. 7, the access point AP3 schedules an r-TWT SP (r-TWT SP3) to occur from times $t_2$ to $t_3$. Accordingly, the access points AP1 and AP2 may avoid scheduling any of their r-TWT SPs to occur between times $t_2$ and $t_3$. In the example of FIG. 7, the access points AP1 and AP2 schedule respective r-TWT SPs (r-TWT SP1 and r-TWT SP2) to occur from times $t_1$ to $t_2$. In some implementations, each of the service periods r-TWT SP1, r-TWT SP2, and r-TWT SP3 may be one example of the r-TWT SP shown in FIG. 4 (from times $t_3$ to $t_8$). Accordingly, the first access point AP1 may communicate latency-sensitive data with one or more low-latency STAs in BSS1 during r-TWT SP1, the second access point AP2 may communicate latency-sensitive data with one or more low-latency STAs in BSS2 during r-TWT SP2, and the third access point AP3 may communicate latency-sensitive data with one or more low-latency STAs in BSS3 during r-TWT In some aspects, the access points AP1 and AP2 may coordinate their allocation of resources for wireless communications during the overlapping service periods r-TWT SP1 and r-TWT SP2 to prevent latency-sensitive traffic in BSS1 from interfering or colliding with latency-sensitive traffic in BSS2. Example suitable resources include, among other examples, transmit power, timing, or frequency allocations for latency-sensitive traffic. In some implementations, the access points AP1 and AP2 may coordinate the transmit times of wireless communications in BSS1 and BSS2 during the service periods r-TWT SP1 and r-TWT SP2. In such implementations, the timing of latency-sensitive traffic in BSS1 may be orthogonal to the timing of latency-sensitive traffic in BSS2. For example, each of the access points AP1 and AP2 may initiate a TXOP during the service periods r-TWT SP1 and r-TWT SP2 by transmitting a multi-user (MU) request-to-send (RTS) frame that solicits concurrent clear-to-send (CTS) frames from multiple STAs, thereby protecting the TXOP from interference by STAs in OBSSs.

In some other implementations, the access points AP1 and AP2 may coordinate the frequency resources (such as RUs) allocated for wireless communications in BSS1 and BSS2 during the service periods r-TWT SP1 and r-TWT SP2. In such implementations, the frequency resources allocated for latency-sensitive traffic in BSS1 may be orthogonal to the frequency resources allocated for latency-sensitive traffic in BSS2. For example, prior to (or during) the service periods r-TWT SP1 and r-TWT SP2, the access points AP1 and AP2 may exchange coordination information indicating an allocation of frequency resources for wireless communications in at least one of BSS1 or BSS2 (such as in accordance with coordinated OFDMA (C-OFDMA) operation). The access points AP1 and AP2 may utilize the coordination information exchange to propose, accept, or negotiate orthogonal frequency resources to be allocated for wireless communications in BSS1 and BSS2 during the overlapping service periods r-TWT SP1 and r-TWT SP2.

Still further, in some implementations, the access points AP1 and AP2 may coordinate the transmit powers of wireless communications in BSS1 and BSS2 during the service periods r-TWT SP1 and r-TWT SP2. In such implementations, the transmit power of latency-sensitive traffic in BSS1 may be suitably low so as not to interfere with latency-sensitive traffic in BSS2 and the transmit power of latency-sensitive traffic in BSS2 may be suitable low so as not to interfere with latency-sensitive traffic in BSS1. For example, prior to (or during) the service periods r-TWT SP1 and r-TWT SP2, the access points AP1 and AP2 may exchange coordination information indicating a transmit power to be used for wireless communications in at least one of BSS1 or BSS2 (such as in accordance with coordinated spatial reuse (C-SR) operation). The access points AP1 and AP2 may utilize the coordination information exchange to propose, accept, or negotiate transmit powers to be used for wireless communications in BSS1 and BSS2 during the overlapping service periods r-TWT SP1 and r-TWT SP2.

Aspects of the present disclosure recognize that STAs located close to an AP (such as STAs 501 and 504 of FIG. 5) are less susceptible to interference from an OBSS than STAs located further from the AP. Thus, lowering the transmit power of wireless communications associated with such STAs may effectively suppress interference between OBSSs during overlapping r-TWT SPs. In some aspects, each of the access points AP1, AP2, and AP3 may assign or otherwise allocate low-latency STAs to the service periods r-TWT SP1, r-TWT SP2, and r-TWT SP3, respectively, based on r-TWT schedule information carried in beacon or other management frames transmitted prior to (or during) one or more r-TWT SPs. In some implementations, the r-TWT schedule information associated with a particular r-TWT SP may assign one or more STAs to that r-TWT SP. In some other implementations, a STA may request to join a particular r-TWT SP responsive to receiving r-TWT schedule information associated with that r-TWT SP.

As shown in FIG. 7, the access point AP1 transmits a beacon frame 701, at time $t_0$, carrying r-TWT schedule information indicating the schedule associated with r-TWT SP1. With reference for example to FIG. 5, the beacon frame 701 may be transmitted by the AP 511 and may assign or otherwise allocate the STA 501 to r-TWT SP1. The access point AP2 transmits a beacon frame 702, at time $t_0$, carrying r-TWT schedule information indicating the schedule associated with r-TWT SP2. With reference for example to FIG. 5, the beacon frame 702 may be transmitted by the AP 512 and may assign or otherwise allocated the STA 504 to r-TWT SP2. The access point AP3 transmits a beacon frame 703, at time $t_0$, carrying r-TWT schedule information indicating the schedule associated with r-TWT SP3. With reference for example to FIG. 5, the beacon frame 703 may assign or otherwise allocate the STA 506 to r-TWT SP3. Although FIG. 7 shows the beacon frames 701-703 being transmitted at the same time ($t_0$), in some other implementations, one or more of the beacon frames 701-703 may be transmitted at a different time.

In some implementations, the beacon frames 701 and 702 broadcast by the coordinated access points AP1 and AP2, respectively, may further carry coordinated r-TWT signaling information. As described herein, the coordinated r-TWT signaling information may indicate the r-TWT SP schedules associated with one or more OBSSs. For example, the beacon frame 701 may carry coordinated r-TWT signaling information indicating the schedules for one or more of the service periods r-TWT SP2 or r-TWT SP3 and the beacon frame 702 may carry coordinated r-TWT signaling information indicating the schedules for one or more of the service periods r-TWT SP1 or r-TWT SP3. More specifically, the schedule for r-TWT SP1 may indicate that r-TWT SP1 is to occur from times $t_1$ to $t_2$, the schedule for r-TWT SP2 may indicate that r-TWT SP2 is also to occur from times $t_1$ to $t_2$, and the schedule for r-TWT SP3 may indicate that r-TWT SP3 is to occur from times $t_2$ to $t_3$.

In some implementations, STAs associated with the access point AP1 (or BSS1) may avoid accessing the wireless channel or otherwise interfering with latency-sensitive communications in BSS3 during r-TWT SP3 based on the coordinated r-TWT signaling information received from the access point AP1. In some other implementations, the access point AP1 may schedule a quiet interval to overlap with r-TWT SP3, for example, to prevent legacy STAs associated with the access point AP1 (or BSS1) from accessing the wireless channel or otherwise interfering with latency-sensitive communications in BSS3 during r-TWT SP3. In some implementations, STAs associated with the access point AP2 (or BSS2) may avoid accessing the wireless channel or otherwise interfering with latency-sensitive communications in BSS3 during r-TWT SP3 based on the coordinated r-TWT signaling information received from the access point AP2. In some other implementations, the access point AP2 may schedule a quiet interval to overlap with r-TWT SP3, for example, to prevent legacy STAs associated with the access point AP2 (or BSS2) from accessing the wireless channel or otherwise interfering with latency-sensitive communications in BSS3 during r-TWT SP3.

Aspects of the present disclosure recognize that the SP coordination techniques described with reference to FIGS. 5-7 require accurate timing information to be conveyed to the devices associated with each of the OBSSs. For example, to avoid accessing a shared wireless channel during an r-TWT SP associated with a given BSS, a STA associated with an OBSS must know (with relative accuracy) the start time of the r-TWT SP. According to existing versions of the IEEE 802.11 standard, the starting time of an SP is defined as an integer value associated with a timing synchronization function (TSF) timer associated with the AP (or BSS) that schedules the SP. The current value of the TSF timer is included in beacons (and other frames) transmitted by the AP and used to synchronize local TSF timers maintained by other devices associated with the BSS. However, the TSF timer associated with a given BSS may be offset in relation to the TSF timer associated with an OBSS. Such offset between TSF timers can affect the accuracy or effectiveness of SP coordination among the OBSSs.

With reference for example to FIG. 5, the AP 511 may broadcast a beacon frame that includes a timestamp having a value equal to 185234501 µs (which corresponds to the value of the TSF timer associated with the AP 511 at the time the beacon is transmitted) and a TWT information element (IE) indicating an SP start time equal to 185236512 µs. In this example, STAs associated with BSS1 (such as the STAs 501 and 502) know that the SP will occur when their local TSF timers indicate 185236514 µs (or 2011 µs after the current beacon frame). However, the TSF timer associated with the AP 512 may be 5.21s ahead of the TSF timer associated with the AP 511. As a result, the TSF timer associated with the AP 512 (as well as the local TSF timers associated with the STAs 503-505) will have a value equal to 190446514 µs at the start of the SP associated with the OBSS. In other words, the TSF timer value (185236512 µs) indicated in the TWT IE of the beacon frame broadcast by the AP 511 does not accurately reflect the start of the SP relative to the TSF timer associated with BSS2.

In some aspects, coordinated APs may correct the timing of SPs indicated by the coordinated r-TWT signaling information transmitted to their associated STAs to account for offsets between TSF timers associated with the coordinated APs. For example, an AP may receive timing information indicating a timing of an SP associated with an OBSS and may transmit, to its associated STAs, corrected (or "coordinated") timing information indicating the timing of the SP relative to a TSF timer associated with the AP. In some implementations, the AP may adjust the received timing information by at least the amount of offset between its TSF timer and a TSF timer associated with the OBSS. For example, if the TSF timer associated with the AP is 5.21s ahead of the TSF timer associated with the OBSS, the AP may add 5.21s to the start time indicated by the received timing information. As a result, the timing information received by the AP may be different than the coordinated timing information transmitted to its associated STAs. In some other implementations, the AP may synchronize its TSF timer with the TSF timer associated with the OBSS. In such implementations, the timing information received by the AP may be the same as the coordinated timing information transmitted to its associated STAs.

Aspects of the present disclosure also recognize that the offset between a TSF timer associated with a BSS and a TSF timer associated with an OBSS may affect the scheduling of quiet intervals coinciding with SPs associated with the OBSS. As described herein, a quiet interval can be scheduled via a quiet element included in management frames (such as beacon frames or probe response frames). The quiet element includes a quiet count field and a quiet offset field. The value of the quiet count field indicates a number of TBTTs until the beacon interval during which the quiet interval begins and the value of the quiet offset field indicates an offset (in TUs) associated with the start of the quiet interval relative to the TBTT specified by the quiet count field. As such, the timing of a quiet interval is defined with respect to the TBTTs associated with the AP that schedules the quiet interval. Because TBTTs are further defined in relation to the TSF timer associated with a given AP, offsets between TSF timers associated with OBSSs may lead to offset TBTTs between the OBSSs. In some aspects, coordinated APs may use the coordinated timing information to schedule quiet intervals that overlap the SPs associated with OBSSs. For example, an AP may specify the start time of a quiet interval (overlapping an SP associated with an OBSS) relative to its own TBTTs.

Figure 8A:
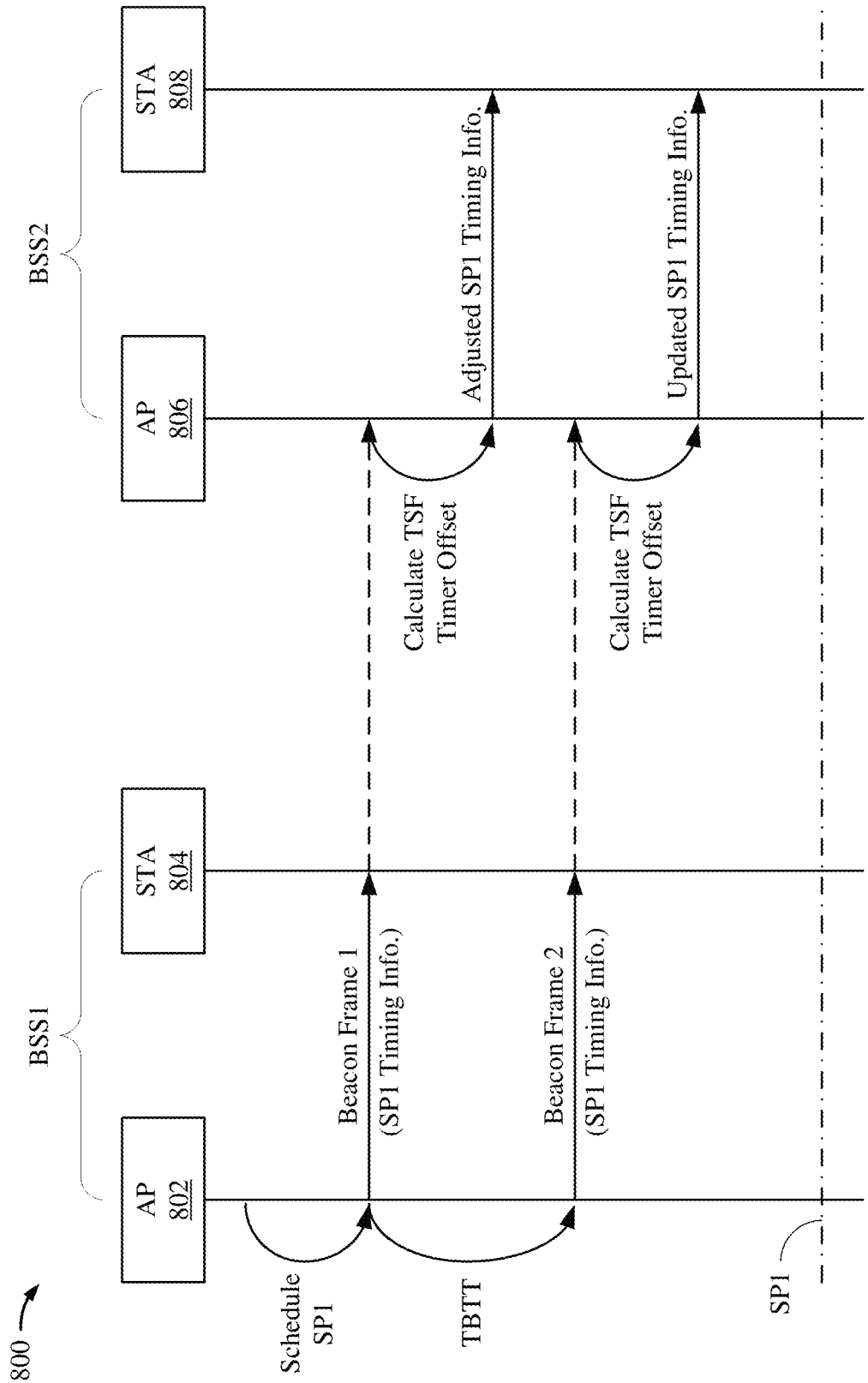
FIG. 8A shows a sequence diagram depicting an example message exchange between devices associated with OBSSs.

FIG. 8A shows a sequence diagram 800 depicting an example message exchange between devices associated with OBSSs (BSS1 and BSS2). As shown in FIG. 8A, BSS1 includes an AP 802 and a STA 804, and BSS2 includes an AP 806 and a STA 808. In some implementations, each of the APs 802 and 806 may be one example of the APs 511 and 512, respectively, of FIG. 5, the STA 804 may be one example of any of the STAs 501 or 502, and the STA 808 may be one example of any of the STAs 503-505.

In some aspects, the APs 802 and 806 may coordinate the scheduling of SPs so that communications in BSS2 do not interfere or collide with communications in BSS1 (such as described with reference to any of FIGS. 5-7). In the example of FIG. 8A, the AP 802 schedules a first SP (SP1) and transmits or broadcasts timing information indicating a timing (or start time) of SP1 to the STA 804. For example, SP1 may be an r-TWT SP, a coordinated r-TWT SP, or a coordinated SP, among other examples. As shown in FIG. 8A, the SP1 timing information may be carried in a first beacon frame (such as in a TWT IE) broadcast by the AP 802. However, in some implementations, the SP1 timing information may be transmitted separately from the beacon frame. For example, the SP1 timing information may be carried in timing advertisement frames, other types of management frames, new frame types, or new fields or information elements in existing frame types. In some implementations, the STA 804 may join SP1 (as a member of an r-TWT SP) responsive to receiving the SP1 timing information from the AP 802.

The AP 806 also receives the first beacon frame and the SP1 timing information from the AP 802 and calculates a TSF timer offset based on a timestamp included in the beacon frame. As described herein, the timestamp indicates the value of the TSF timer associated with the AP 802 at the time the beacon frame is transmitted. In some implementations, the offset between the TSF timers associated with the APs 802 and 806 can be determined as the difference between the timestamp included in the first beacon frame and the value of the TSF timer associated with the AP 806 at the time the first beacon frame is received (plus propagation delay). In some implementations, the amount of propagation delay can be estimated by the AP 806 (for example, based on frames or packets received from the AP 802). In some other implementations, the amount of propagation delay can be estimated by the AP 802 and provided to the AP 806 (for example, in the beacon frame or other frames transmitted to the AP 806). Still further, in some implementations, the AP 806 may assume the propagation delay to be negligible. In some aspects, the AP 806 may adjust the received SP1 timing information to account for the TSF timer offset between the APs 802 and 806. For example, the AP 806 may add the TSF timer offset to the received SP1 timing information to obtain the adjusted SP1 timing information (where the TSF timer offset is a positive or negative value depending on whether the TSF timer associated with the AP 806 is ahead of, or behind, the TSF timer associated with the AP 802).

In some aspects, the AP 806 may schedule one or more SPs (associated with BSS2) based on the adjusted SP1 timing information. In some implementations, the AP 806 may schedule a second SP to be orthogonal in time to SP1 (such as described with reference to FIG. 6). In some other implementations, the AP 806 may schedule a second SP to overlap in time with SP1 (such as described with reference to FIG. 7). In such implementations, the access points AP 802 and 806 may further coordinate the allocation of resources (such as transmit power, timing, or frequency allocations) for wireless communications during the overlapping service periods. In some aspects, the AP 806 may further transmit or broadcast the adjusted SP1 timing information to the STA 808. In some implementations, the adjusted SP1 timing information may be carried in beacons or other management frames (such as in a TWT IE or a timing advertisement element). In some other implementations, the adjusted SP1 timing information may be carried in a timing advertisement frame. Still further, in some implementations, the adjusted SP1 timing information may be carried in a new type of frame or in a new field or IEs of an existing frame.

In some aspects, the AP 806 may further schedule a quiet interval to at least partially overlap SP1. For example, the AP 806 transmit beacons or management frames including a quiet element indicating the timing of the quiet interval. In some implementations, the AP 806 may configure one or more fields of the quiet element to indicate the timing of the quiet interval based on the adjusted SP1 timing information. For example, the AP 806 may set the values of the quiet count field and the quiet offset field to indicate the start time of the quiet interval relative to the TBTTs associated with the AP 806. As a result, non-legacy STAs (such as the STA 808) associated with the AP may schedule their communications to avoid interfering with communications in BSS1, during SP1, based on the adjusted SP1 timing information, while legacy STAs (not shown for simplicity) associated with the AP may avoid accessing the wireless channel during the scheduled quiet interval (which overlaps SP1).

After a TBTT, the AP 802 transmits or broadcasts a second beacon frame. Because the second beacon frame is transmitted prior to the start of SP1, the second beacon frame also may carry the SP1 timing information. In some implementations, the AP 806 may receive the second beacon frame from the AP 802 and may calculate another TSF timer offset based on a timestamp included in the second beacon frame. In some instances, the TSF timer offset associated with the second beacon frame may be different than the TSF timer offset associated with the first beacon frame as a result of clock drift between the TSF timers associated with the APs 802 and 806. For example, the TSF timer associated with the AP 802 may be faster or slower than the TSF timer associated with the AP 806. As a result, the AP 806 may receive the second beacon frame sooner or later than expected (in relation to the beacon interval indicated by the beacon frames).

In some aspects, the AP 806 may further adjust the SP1 timing information based on the most recent TSF timer offset. As such, the SP1 timing information may be periodically updated or adjusted to account for clock drift between the TSF timers associated with the APs 802 and 806. In some implementations, the AP 806 may reschedule (or update the schedule for) one or more of the SP associated with BSS2 to account for changes in the relative timing of SP1 due to clock drift. In some aspects, the AP 806 may further transmit or broadcast the updated SP1 timing information to the STA 808. In some implementations, the AP 806 also may update any quiet intervals scheduled to overlap SP1 based on the amount of clock drift. For example, the AP 806 may transmit beacons or management frames including a quiet element with updated timing information associated with the quiet interval. More specifically, the AP 806 may update the values of the quiet count field and the quiet offset field to account for the amount of clock drift between the TSF timers associated with the APs 802 and 806.

Aspects of the present disclosure recognize that the TSF timers associated with OBSSs may continue to drift over time. However, frequently updating the SP1 timing information may consume significant resources and communications overhead among devices in BSS2 (such as the AP 806 and the STA 808). Thus, in some aspects, the AP 806 may factor clock drift into the timing information provided to the STA 808. In some implementations, the AP 806 may determine an amount of clock drift between the TSF timers based on the timer offsets calculated with respect to successive beacon frames received from the AP 802. More specifically, changes in the calculated timer offset between successive beacon frames may reflect the amount of clock drift between the TSF timers associated with the APs 802 and 806. In some implementations, the AP 806 may transmit or broadcast clock drift information, indicating the amount of clock drift, to its associated STAs. In such implementations, the STAs may further adjust the received SP1 timing information to account for clock drift. In some other implementations, the AP 806 may add a buffer period to the SP1 timing information provided to its associated STAs. In such implementations, the buffer period may be long enough to at least account for clock drift or propagation delay.

Figure 8B:
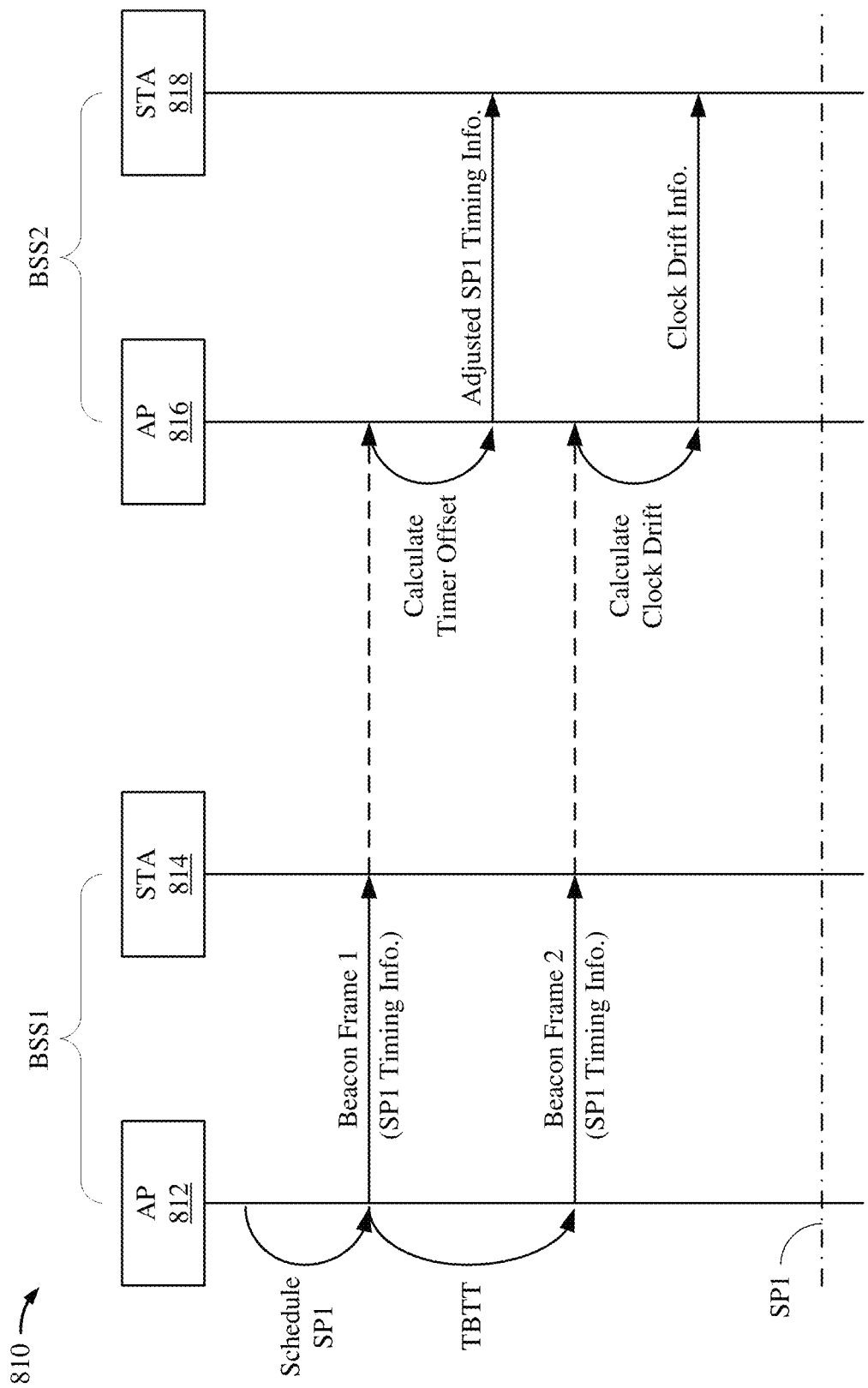
FIG. 8B shows a sequence diagram depicting an example message exchange between devices associated with OBSSs.

FIG. 8B shows a sequence diagram 810 depicting an example message exchange between devices associated with OBSSs (BSS1 and BSS2). As shown in FIG. 8B, BSS1 includes an AP 812 and a STA 814, and BSS2 includes an AP 816 and a STA 818. In some implementations, each of the APs 812 and 816 may be one example of the APs 511 and 512, respectively, of FIG. 5, the STA 814 may be one example of any of the STAs 501 or 502, and the STA 818 may be one example of any of the STAs 503-505.

In some aspects, the APs 812 and 816 may coordinate the scheduling of SPs so that communications in BSS2 do not interfere or collide with communications in BSS1 (such as described with reference to any of FIGS. 5-7). In the example of FIG. 8B, the AP 812 schedules a first SP (SP1) and transmits or broadcasts timing information indicating a timing (or start time) of SP1 to the STA 814. For example, SP1 may be an r-TWT SP, a coordinated r-TWT SP, or a coordinated SP, among other examples. As shown in FIG. 8B, the SP1 timing information may be carried in a first beacon frame (such as in a TWT IE) broadcast by the AP 812. However, in some implementations, the SP1 timing information may be transmitted separately from the beacon frame. For example, the SP1 timing information may be carried in timing advertisement frames, other types of management frames, new frame types, or new fields or information elements in existing frame types. In some implementations, the STA 814 may join SP1 (as a member of an r-TWT SP) responsive to receiving the SP1 timing information from the AP 812.

The AP 816 also receives the first beacon frame and the SP1 timing information from the AP 812 and calculates a TSF timer offset based on a timestamp included in the beacon frame. As described herein, the timestamp indicates the value of the TSF timer associated with the AP 812 at the time the beacon frame is transmitted. In some implementations, the offset between the TSF timers associated with the APs 812 and AP 816 can be determined as the difference between the timestamp included in the first beacon frame and the value of the TSF timer associated with the AP 816 at the time the first beacon frame is received (plus propagation delay). In some implementations, the amount of propagation delay can be estimated by the AP 816 (for example, based on frames or packets received from the AP 812). In some other implementations, the amount of propagation delay can be estimated by the AP 812 and provided to the AP 816 (for example, in the beacon frame or other frames transmitted to the AP 816). Still further, in some implementations, the AP 816 may assume the propagation delay to be negligible. In some aspects, the AP 816 may adjust the received SP1 timing information to account for the TSF timer offset between the APs 812 and 816. For example, the AP 816 may add the TSF timer offset to the received SP1 timing information to obtain the adjusted SP1 timing information (where the TSF timer offset is a positive or negative value depending on whether the TSF timer associated with the AP 816 is ahead of, or behind, the TSF timer associated with the AP 812).

In some aspects, the AP 816 may schedule one or more SPs (associated with BSS2) based on the adjusted SP1 timing information. In some implementations, the AP 816 may schedule a second SP to be orthogonal in time to SP1 (such as described with reference to FIG. 6). In some other implementations, the AP 816 may schedule a second SP to overlap in time with SP1 (such as described with reference to FIG. 7). In such implementations, the access points AP 812 and 816 may further coordinate the allocation of resources (such as transmit power, timing, or frequency allocations) for wireless communications during the overlapping service periods. In some aspects, the AP 816 may further transmit or broadcast the adjusted SP1 timing information to the STA 818. In some implementations, the adjusted SP1 timing information may be carried in beacons or other management frames (such as in a TWT IE or a timing advertisement element). In some other implementations, the adjusted SP1 timing information may be carried in a timing advertisement element of a timing advertisement frame. Still further, in some implementations, the adjusted SP1 timing information may be carried in a new type of frame or in a new field or IEs of an existing frame.

In some aspects, the AP 816 may further schedule a quiet interval to at least partially overlap SP1. For example, the AP 816 may transmit beacons or management frames including a quiet element indicating the timing of the quiet interval. In some implementations, the AP 816 may configure one or more fields of the quiet element to indicate the timing of the quiet interval based on the adjusted SP1 timing information. For example, the AP 816 may set the values of the quiet count field and the quiet offset field to indicate the start time of the quiet interval relative to the TBTTs associated with the AP 816. As a result, non-legacy STAs (such as the STA 818) associated with the AP may schedule their communications to avoid interfering with communications in BSS1, during SP1, based on the adjusted SP1 timing information, while legacy STAs (not shown for simplicity) associated with the AP may avoid accessing the wireless channel during the scheduled quiet interval (which overlaps SP1).

After a TBTT, the AP 812 transmits or broadcasts a second beacon frame. Because the second beacon frame is transmitted prior to the start of SP1, the second beacon frame also may carry the SP1 timing information. In some implementations, the AP 816 may receive the second beacon frame from the AP 812 and may calculate an amount of clock drift between the TSF timers associated with the APs 812 and 816 based on a timestamp included in the second beacon frame. For example, the AP 816 may calculate an updated timer offset between the TSF timers associated with the APs 812 and 816 based on the timestamp included in the second beacon frame and may determine the amount of clock drift based on changes or differences in the timer offsets calculated with respect to the first beacon frame and the second beacon frame. In some implementations, the AP 816 may reschedule (or update the schedule for) one or more of the SPs associated with BSS2 to account for changes in the relative timing of SP1 due to clock drift.

In some aspects, the AP 816 may further transmit or broadcast clock drift information, indicating the amount of clock drift (plus propagation delay), to the STA 818. In some implementations, the amount of propagation delay can be estimated by the AP 816 (for example, based on frames or packets received from the AP 812). In some other implementations, the amount of propagation delay can be estimated by the AP 812 and provided to the AP 816 (for example, in the beacon frame or other frames transmitted to the AP 816). Still further, in some implementations, the AP 816 may assume the propagation delay to be negligible. In some implementations, the clock drift information may indicate the exact amount of clock drift between the APs 812 and 816. In some other implementations, the clock drift information may indicate a relative amount of clock drift (such as in relation to a reference timer or value). In some implementations, the clock drift information may indicate a timing error (such as a mean or standard deviation of the estimated error associated with the clock drift information). Still further, in some implementations, the clock drift information may include an estimated time difference between a reference time and a timestamp included with the clock drift information (such as in the same frame or packet).

In some implementations, the clock drift information may be carried in beacons or other management frames (such as in a new field or IE or a timing advertisement element). In some other implementations, the clock drift information may be carried in a timing advertisement frame. Still further, in some implementations, the clock drift information may be carried in a new type of frame or in a new field or IEs of an existing frame. As a result, the STA 818 may update the SP1 timing information previously received from the AP 816 to account for the clock drift. For example, the STA 818 may calculate how far apart the TSF timers associated with the APs 812 and 816 will drift by the start of SP1 and update the SP1 timing information to account for the amount of drift. Accordingly, the STA 818 may schedule its communications to avoid interfering with communications in BSS1, during SP1, based on the updated SP1 timing information.

Aspects of the present disclosure recognize that legacy STAs may not be able to interpret the clock drift information transmitted or broadcast by the AP 816. Thus, in some implementations, the AP 816 may further update any quiet intervals scheduled to overlap SP1 based on the amount of clock drift. For example, the AP 816 may transmit beacons or management frames including a quiet element with updated timing information associated with the quiet interval. More specifically, the AP 816 may update the values of the quiet count field and the quiet offset field to account for the amount of clock drift between the TSF timers associated with the APs 802 and 806. As a result, any legacy STAs associated with the AP also may update their channel access schedules to avoid accessing the wireless channel during the updated quiet intervals (which are corrected to overlap SP1 due to clock drift).

Figure 8C:
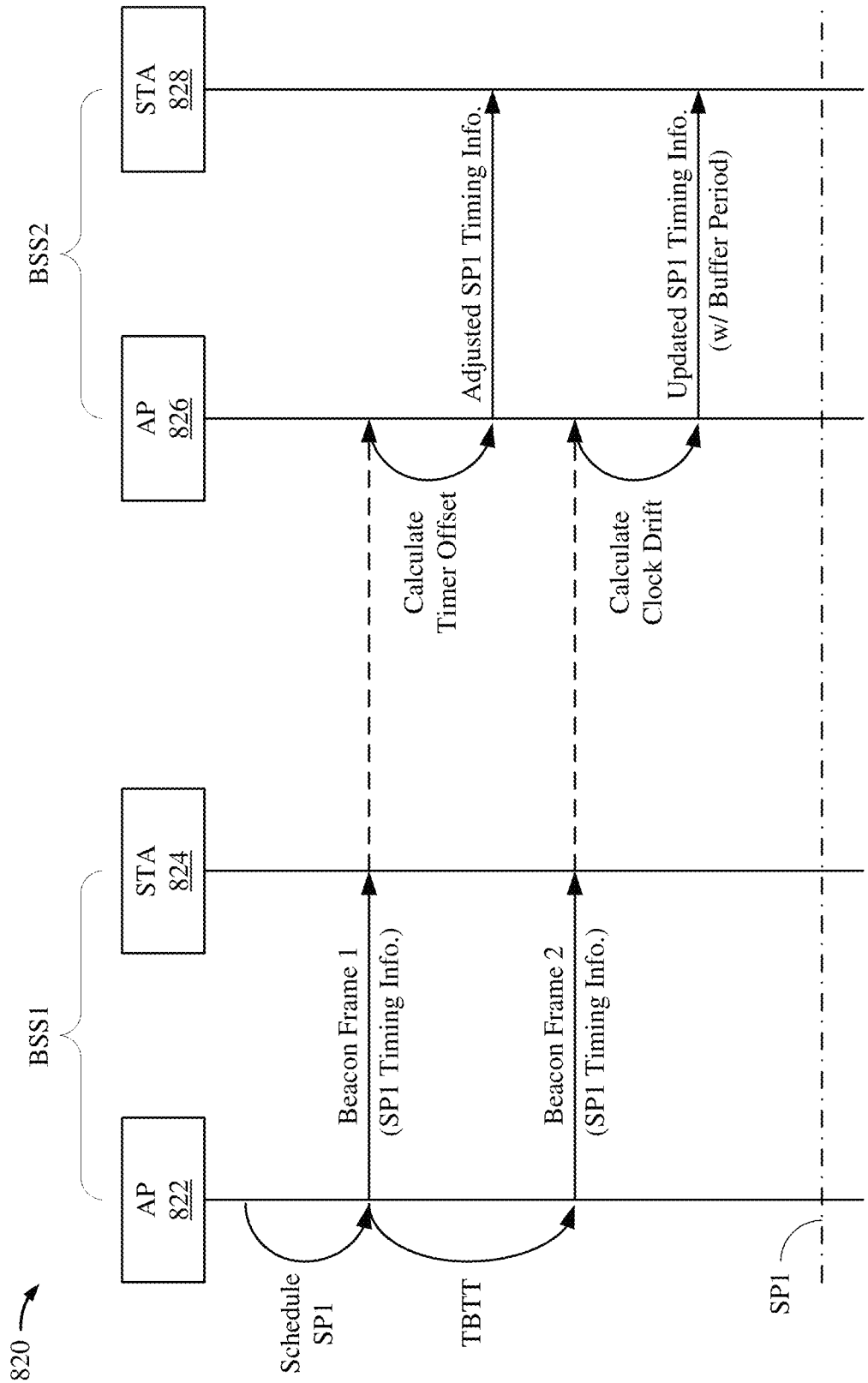
FIG. 8C shows a sequence diagram depicting an example message exchange between devices associated with OBSSs.

FIG. 8C shows a sequence diagram 820 depicting an example message exchange between devices associated with OBSSs (BSS1 and BSS2). As shown in FIG. 8C, BSS1 includes an AP 822 and a STA 824, and BSS2 includes an AP 826 and a STA 828. In some implementations, each of the APs 822 and 826 may be one example of the APs 511 and 512, respectively, of FIG. 5, the STA 824 may be one example of any of the STAs 501 or 502, and the STA 828 may be one example of any of the STAs 503-505.

In some aspects, the APs 822 and 826 may coordinate the scheduling of SPs so that communications in BSS2 do not interfere or collide with communications in BSS1 (such as described with reference to any of FIGS. 5-7). In the example of FIG. 8C, the AP 822 schedules a first SP (SP1) and transmits or broadcasts timing information indicating a timing (or start time) of SP1 to the STA 824. For example, SP1 may be an r-TWT SP, a coordinated r-TWT SP, or a coordinated SP, among other examples. As shown in FIG. 8C, the SP1 timing information may be carried in a first beacon frame (such as in a TWT IE) broadcast by the AP 822. However, in some implementations, the SP1 timing information may be transmitted separately from the beacon frame. For example, the SP1 timing information may be carried in timing advertisement frames, other types of management frames, new frame types, or new fields or information elements in existing frame types. In some implementations, the STA 824 may join SP1 (as a member of an r-TWT SP) responsive to receiving the SP1 timing information from the AP 822.

The AP 826 also receives the first beacon frame and the SP1 timing information from the AP 822 and calculates a TSF timer offset based on a timestamp included in the beacon frame. As described herein, the timestamp indicates the value of the TSF timer associated with the AP 822 at the time the beacon frame is transmitted. In some implementations, the offset between the TSF timers associated with the APs 822 and AP 826 can be determined as the difference between the timestamp included in the first beacon frame and the value of the TSF timer associated with the AP 826 at the time the first beacon frame is received (plus propagation delay). In some implementations, the amount of propagation delay can be estimated by the AP 826 (for example, based on frames or packets received from the AP 822). In some other implementations, the amount of propagation delay can be estimated by the AP 822 and provided to the AP 826 (for example, in the beacon frame or other frames transmitted to the AP 826). Still further, in some implementations, the AP 826 may assume the propagation delay to be negligible. In some aspects, the AP 826 may adjust the received SP1 timing information to account for the TSF timer offset between the APs 822 and 826. For example, the AP 826 may add the TSF timer offset to the received SP1 timing information to obtain the adjusted SP1 timing information (where the TSF timer offset is a positive or negative value depending on whether the TSF timer associated with the AP 826 is ahead of, or behind, the TSF timer associated with the AP 822).

In some aspects, the AP 826 may schedule one or more SPs (associated with BSS2) based on the adjusted SP1 timing information. In some implementations, the AP 826 may schedule a second SP to be orthogonal in time to SP1 (such as described with reference to FIG. 6). In some other implementations, the AP 826 may schedule a second SP to overlap in time with SP1 (such as described with reference to FIG. 7). In such implementations, the access points AP 822 and 826 may further coordinate the allocation of resources (such as transmit power, timing, or frequency allocations) for wireless communications during the overlapping service periods. In some aspects, the AP 826 may further transmit or broadcast the adjusted SP1 timing information to the STA 828. In some implementations, the adjusted SP1 timing information may be carried in beacons or other management frames (such as in a TWT IE or a timing advertisement element). In some other implementations, the adjusted SP1 timing information may be carried in a timing advertisement frame. Still further, in some implementations, the adjusted SP1 timing information may be carried in a new type of frame or in a new field or IEs of an existing frame.

In some aspects, the AP 826 may further schedule a quiet interval to at least partially overlap SP1. For example, the AP 826 may transmit beacons or management frames including a quiet element indicating the timing of the quiet interval. In some implementations, the AP 826 may configure one or more fields of the quiet element to indicate the timing of the quiet interval based on the adjusted SP1 timing information. For example, the AP 826 may set the values of the quiet count field and the quiet offset field to indicate the start time of the quiet interval relative to the TBTTs associated with the AP 826. As a result, non-legacy STAs (such as the STA 828) associated with the AP may schedule their communications to avoid interfering with communications in BSS1, during SP1, based on the adjusted SP1 timing information, while legacy STAs (not shown for simplicity) associated with the AP may avoid accessing the wireless channel during the scheduled quiet interval (which overlaps SP1).

After a TBTT, the AP 822 transmits or broadcasts a second beacon frame. Because the second beacon frame is transmitted prior to the start of SP1, the second beacon frame also may carry the SP1 timing information. In some implementations, the AP 826 may receive the second beacon frame from the AP 822 and may calculate an amount of clock drift between the TSF timers associated with the APs 822 and 826 based on a timestamp included in the second beacon frame. For example, the AP 826 may calculate an updated timer offset between the TSF timers associated with the APs 822 and 826 based on the timestamp included in the second beacon frame and may determine the amount of clock drift based on changes or differences in the timer offsets calculated with respect to the first beacon frame and the second beacon frame. In some implementations, the AP 826 may reschedule (or update the schedule for) one or more of the SPs associated with BSS2 to account for changes in the relative timing of SP1 due to clock drift.

In some aspects, the AP 826 may further update the SP1 timing information based on the clock drift. In some implementations, the AP 826 may add a buffer period to the adjusted SP1 timing information calculated with respect to the first beacon frame. The buffer period provides a margin of error for the adjusted SP1 timing information to ensure that devices associated with BSS2 do not interfere with communications in BSS1 at the start of SP1. Thus, the duration of the buffer period may be greater than or equal to the amount of clock drift expected to occur by the start of SP1. In some implementations, the AP 826 may add a buffer period to the adjusted SP1 timing information even if the amount of clock drift is unknown. For example, the buffer period may have a fixed duration (such as 100 μs) that is long enough to account for a threshold amount of clock drift (or propagation delay). In some aspects, the AP 826 may further transmit or broadcast the updated SP1 timing information to the STA 828. In some implementations, the updated SP1 timing information may be carried in beacons or other management frames (such as in a TWT IE or a timing advertisement element). In some other implementations, the updated SP1 timing information may be carried in a timing advertisement frame. Still further, in some implementations, the updated SP1 timing information may be carried in a new type of frame or in a new field or IEs of an existing frame.

Aspects of the present disclosure recognize that legacy STAs may not be able to interpret the updated SP1 timing information transmitted or broadcast by the AP 826. Thus, in some implementations, the AP 826 may further update any quiet intervals scheduled to overlap SP1 based on the amount of clock drift. For example, the AP 826 may transmit beacons or management frames including a quiet element with updated timing information associated with the quiet interval. More specifically, the AP 826 may update the values of the quiet count field and the quiet offset field to account for the amount of clock drift between the TSF timers associated with the APs 802 and 806. As a result, any legacy STAs associated with the AP also may update their channel access schedules to avoid accessing the wireless channel during the updated quiet intervals (which are corrected to overlap SP1 due to clock drift).

Figure 9:
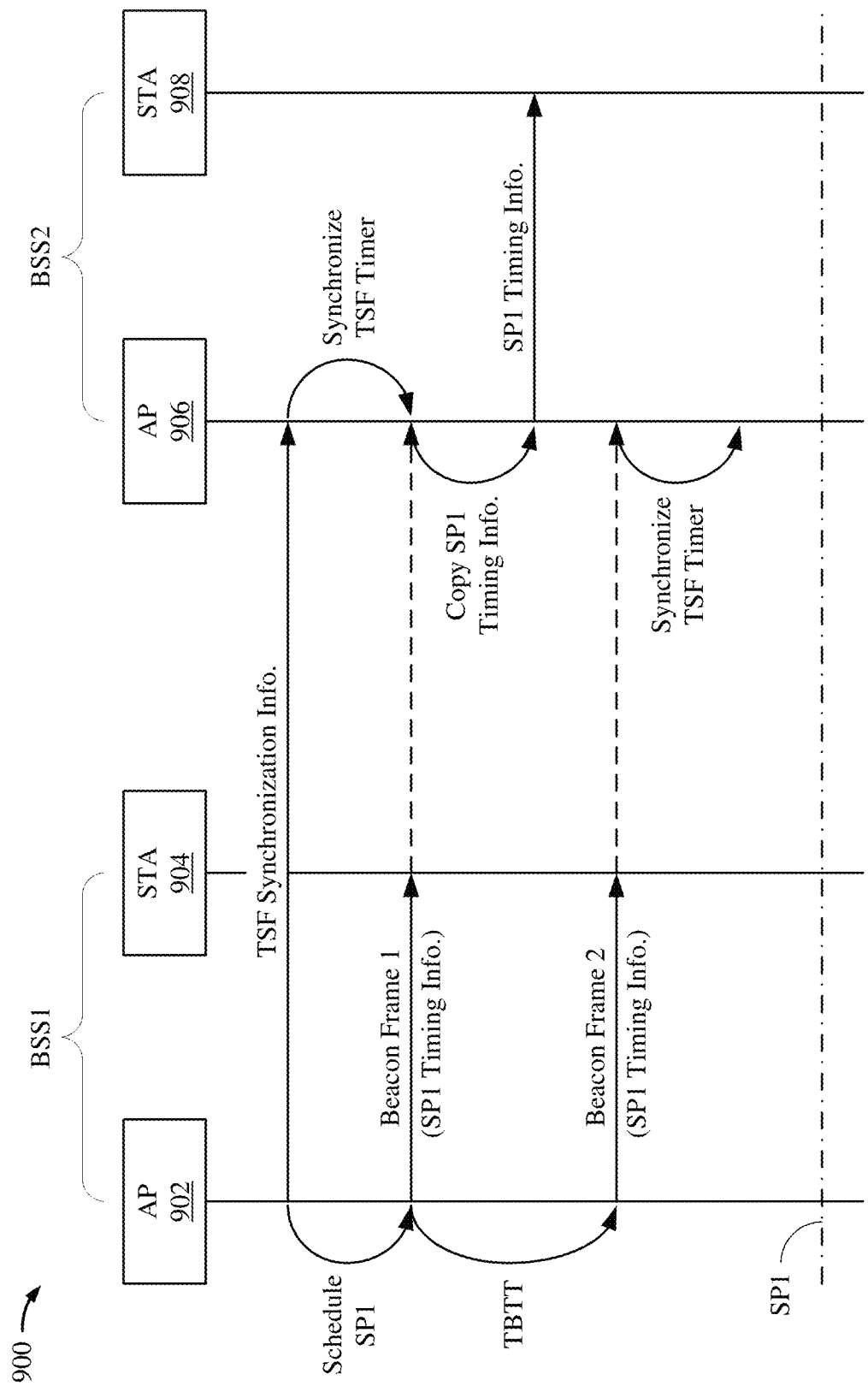
FIG. 9 shows a sequence diagram depicting an example message exchange between devices associated with OBSSs.

FIG. 9 shows a sequence diagram 900 depicting an example message exchange between devices associated with OBSSs (BSS1 and BSS2). As shown in FIG. 9, BSS1 includes an AP 902 and a STA 904, and BSS2 includes an AP 906 and a STA 908. In some implementations, each of the APs 902 and 906 may be one example of the APs 511 and 512, respectively, of FIG. 5, the STA 904 may be one example of any of the STAs 501 or 502, and the STA 908 may be one example of any of the STAs 503-505.

In some aspects, the APs 902 and 906 may synchronize their respective TSF timers. For example, each AP in a group of coordinated APs may synchronize its TSF timer to a master AP associated with the group. For example, the master AP may be selected as the AP with the fastest drifting TSF timer among the group of coordinated APs. Other suitable master AP selection criteria may include various capability and operation parameters (such as r-TWT SPs, r-TWT support, or BSS load, among other examples). In some implementations, the master AP may be negotiated or otherwise designated upon establishing the group of coordinated APs. In some other implementations, the master AP may be dynamically selected so that the most suitable AP is selected as the master AP at any given time (based on the selection criteria). In the example of FIG. 9, the AP 902 is selected as the master AP. Thus, the AP 906 may synchronize its TSF timer to the TSF timer associated with the AP 902.

In some implementations, the AP 902 may transmit TSF synchronization information to the AP 906. The TSF synchronization information may include any information that can be used by the AP 906 to synchronize its TSF timer to the TSF timer associated with the AP 902. In some implementations, the TSF synchronization information may include a timestamp of a beacon frame transmitted or broadcast by the AP 902. In some other implementations, the TSF synchronization information may be carried in a timing advertisement frame. Still further, in some implementations, the TSF synchronization information may be carried in a new type of frame or in a new field or IEs of an existing frame.

In some aspects, the AP 902 may transmit the TSF synchronization information separately from beacon frames transmitted to its associated STAs (such as the STA 904), for example, to ensure more reliable delivery of the TSF synchronization information. In some implementations, the TSF synchronization information may be transmitted on a different channel than the wireless channel on which intra-BSS communications (such as between the AP 902 and the STA 904) occur. In some other implementations, the TSF synchronization information may be transmitted during designated SPs (such as particular r-TWT SPs). In some implementations, one or more STAs may act as bridges or relays between coordinated APs. For example, if the STA 908 is within the coverage area of the AP 902, the STA 908 may receive or intercept the TSF synchronization information from the AP 902 and forward the information to the AP 906.

In some aspects, the AP 906 may synchronize its TSF timer to the TSF timer associated with the AP 902 based on the received TSF synchronization information. As described herein, the timestamp included in a beacon frame indicates the value of the TSF timer associated with the AP 902 at the time the beacon frame is transmitted. Thus, in some implementations, the AP 906 may synchronize its TSF timer to the TSF timer associated with the AP 902 by setting its TSF timer to the value indicated by the timestamp of a beacon frame received from the AP 902 (plus propagation delay). In some implementations, the amount of propagation delay can be estimated by the AP 826 (for example, based on frames or packets received from the AP 822). In some other implementations, the amount of propagation delay can be estimated by the AP 822 and provided to the AP 826 (for example, in the beacon frame or other frames transmitted to the AP 826). Still further, in some implementations, the AP 826 may assume the propagation delay to be negligible. Any STAs associated with the AP 906 (such as the STA 908) may synchronize their respective TSF timers to the TSF timer associated with the AP 906 based on beacon frames transmitted or broadcast by the AP 906 (in accordance with existing versions of the IEEE 802.11 standard).

In some aspects, the APs 902 and 906 may coordinate the scheduling of SPs so that communications in BSS2 do not interfere or collide with communications in BSS1 (such as described with reference to any of FIGS. 5-7). In the example of FIG. 9, the AP 902 schedules a first SP (SP1) and transmits or broadcasts timing information indicating a timing (or start time) of SP1 to the STA 904. For example, SP1 may be an r-TWT SP, a coordinated r-TWT SP, or a coordinated SP, among other examples. As shown in FIG. 9, the SP1 timing information may be carried in a first beacon frame (such as in a TWT IE) broadcast by the AP 902. However, in some implementations, the SP1 timing information may be transmitted separately from the beacon frame. For example, the SP1 timing information may be carried in timing advertisement frames, other types of management frames, new frame types, or new fields or information elements in existing frame types. In some implementations, the STA 904 may join SP1 (as a member of an r-TWT SP) responsive to receiving the SP1 timing information from the AP 902.

The AP 906 also receives the first beacon frame and the SP1 timing information from the AP 902. In some aspects, the AP 906 may schedule one or more SPs (associated with BSS2) based on the received SP1 timing information. Because the TSF timers are synchronized among the APs 902 and 906 (and their associated STAs), the AP 906 does not need to adjust the SP1 timing information to account for timer offset. In some implementations, the AP 906 may schedule a second SP to be orthogonal in time to SP1 (such as described with reference to FIG. 6). In some other implementations, the AP 906 may schedule a second SP to overlap in time with SP1 (such as described with reference to FIG. 7). In such implementations, the access points AP 902 and 906 may further coordinate the allocation of resources (such as transmit power, timing, or frequency allocations) for wireless communications during the overlapping service periods. In some aspects, the AP 906 may further transmit or broadcast the SP1 timing information to the STA 908. For example, the AP 906 may copy the received SP1 timing information directly into a packet or frame for transmission to the STA 908. In some implementations, the SP1 timing information may be carried in beacons or other management frames (such as in a TWT IE or a timing advertisement element). In some other implementations, the SP1 timing information may be carried in a timing advertisement frame. Still further, in some implementations, the SP1 timing information may be carried in a new type of frame or in a new field or IEs of an existing frame.

In some aspects, the AP 906 may further schedule a quiet interval to at least partially overlap SP1. For example, the AP 906 may transmit beacons or management frames including a quiet element indicating the timing of the quiet interval. In some implementations, the AP 906 may set the values of the quiet count field and the quiet offset field to indicate the start time of the quiet interval relative to the TBTTs associated with the AP 906. As a result, non-legacy STAs (such as the STA 908) associated with the AP may schedule their communications to avoid interfering with communications in BSS1, during SP1, based on the SP1 timing information, while legacy STAs (not shown for simplicity) associated with the AP may avoid accessing the wireless channel during the scheduled quiet interval (which overlaps SP1).

After a TBTT, the AP 902 transmits or broadcasts a second beacon frame. Because the second beacon frame is transmitted prior to the start of SP1, the second beacon frame also may carry the SP1 timing information. As described herein, the TSF timers associated with the APs 902 and 906 may drift apart over time. In some implementations, the AP 906 may resynchronize its TSF timer to the TSF timer associated with the AP 902 based on the timestamp included in the second beacon frame. Any STAs associated with the AP 906 (such as the STA 908) may synchronize their respective TSF timers to the TSF timer associated with the AP 906 based on beacon frames transmitted or broadcast by the AP 906 (in accordance with existing versions of the IEEE 802.11 standard). Because the TSF timers are synchronized among the APs 902 and 906 (and their associated STAs), the AP 906 does not need to update the SP1 timing information to correct for clock drift (such as described with reference to FIG. 8A), transmit clock drift information to the STA 908 (such as described with reference to FIG. 8B), or add a buffer period to the SP1 timing information (such as described with reference to FIG. 8C).

Figure 10:
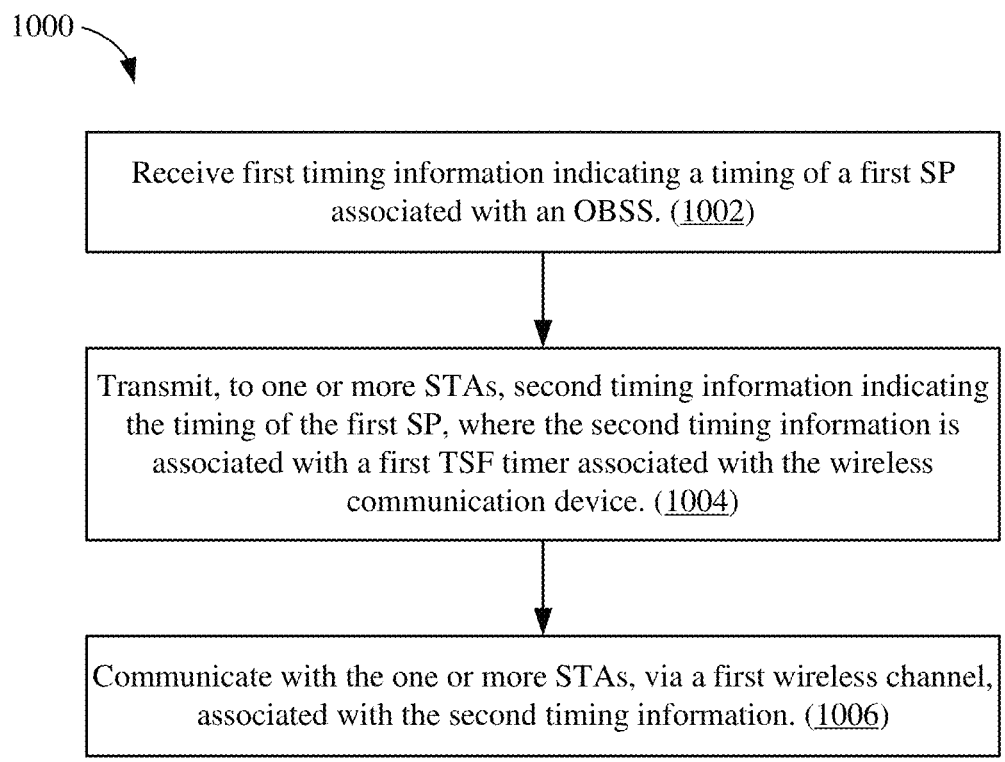
FIG. 10 shows an illustrative flowchart depicting an example wireless communication operation.

FIG. 10 shows an illustrative flowchart 1000 depicting an example wireless communication operation. The example operation 1000 may be performed by a wireless communication device such as any of the APs 110 or 300 of FIGS. 1 and 3, respectively.

The wireless communication device receives first timing information indicating a timing of a first SP associated with an OBSS (1002). The wireless communication device transmits, to one or more STAs, second timing information indicating the timing of the first SP, where the second timing information is associated with a first TSF timer associated with the wireless communication device (1004). The wireless communication device further communicates with the one or more STAs, via a first wireless channel, associated with the second timing information (1006).

In some aspects, the first timing information may be different than the second timing information. In some implementations, the wireless communication device may further receive, from an AP associated with the OBSS, a second beacon frame that includes a first timestamp associated with a second TSF timer and perform a timer offset calculation operation that indicates an offset between the first TSF timer and the second TSF timer associated with the first timestamp. In some implementations, the difference between the first timing information and the second timing information may be equal to the offset indicated by the timer offset calculation operation.

In some implementations, the wireless communication device may further receive, from the AP, a third beacon frame that includes a second timestamp associated with a second TSF timer and perform a clock drift calculation operation that indicates an amount of drift between the first TSF timer and the second TSF timer associated with the first timestamp and the second timestamp. In some implementations, the difference between the first timing information and the second timing information may be equal to the offset indicated by the timer offset calculation operation plus a buffer duration that is greater than or equal to the amount of drift indicated by the clock drift calculation operation. In some other implementations, the wireless communication device may further transmit, to the one or more STAs, clock drift information indicating the amount of drift between the first TSF timer and the second TSF timer.

In some other aspects, the first timing information may be equal to the second timing information. In some implementations, the wireless communication device may further obtain, from an AP associated with the OBSS, TSF synchronization information associated with a second TSF timer and synchronize the first TSF timer to the second TSF timer associated with the TSF synchronization information. In some implementations, the TSF synchronization information may be received over a second wireless channel that is different than the first wireless channel. In some other implementations, the TSF synchronization information may be received during a second SP that is different than the first SP. Still further, in some implementations, a STA associated with the wireless communication device may intercept the TSF synchronization information from the AP and relay or retransmit the information to the wireless communication device.

In some aspects, the communications between the wireless communication device and the one or more STAs may be orthogonal to communications associated with the OBSS during the first SP. In some implementations, the wireless communication device may transmit scheduling information indicating a second SP associated with the wireless communication device, where the communications between the wireless communication device and the one or more STAs occurs during the second SP. Still further, in some aspects, the wireless communication device may transmit a quiet element associated with the first TSF timer, where the quiet element indicates a quiet interval that overlaps the first SP.

FIG. 11 shows an illustrative flowchart 1100 depicting an example wireless communication operation. The example operation 1100 may be performed by a wireless communication device such as any of the STAs 120a-120i of FIG. 1 or the STA 200 of FIG. 2.

The wireless communication device synchronizes a local TSF timer with a first TSF timer associated with a BSS (1102). The wireless communication device receives timing information indicating a timing of a first SP associated with an OBSS, where the timing information is associated with the first TSF timer (1104). The wireless communication device further communicates with one or more devices associated with the BSS and the received timing information (1106).

In some implementations, the wireless communication device may further receive clock drift information indicating an amount of clock drift between the first TSF timer and a second TSF timer associated with the OBSS, where the communications between the wireless communication device and the one or more devices is further associated with the received clock drift information. In some implementations, the wireless communication device may further receive, from a first AP associated with the OBSS, TSF synchronization information associated with a second TSF timer and transmit the TSF synchronization information to a second AP associated with the BSS.

In some aspects, the wireless communications between the wireless communication device and the one or more devices may be orthogonal to communications associated with the OBSS during the first SP. In some implementations, the wireless communication device may further receive scheduling information indicating a second SP associated with the BSS, where the communications between the wireless communication device and the one or more devices occur during the second SP.

Figure 12:
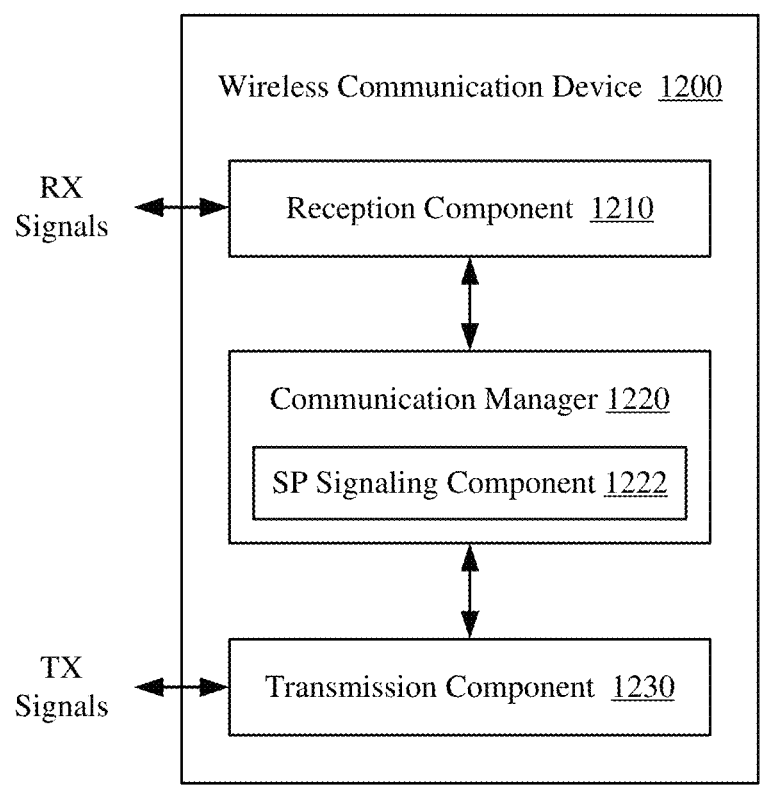
FIG. 12 shows a block diagram of an example wireless communication device.

FIG. 12 shows a block diagram of an example wireless communication device 1200. In some implementations, the wireless communication device 1200 may be configured to perform the operation 1000 described with reference to FIG. 10. The wireless communication device 1200 can be an example implementation of any of the APs 110 or 300 of FIGS. 1 and 3, respectively. More specifically, the wireless communication device 1200 can be a chip, SoC, chipset, package or device that includes at least one processor and at least one modem (for example, a Wi-Fi (IEEE 802.11) modem or a cellular modem).

The wireless communication device 1200 includes a reception component 1210, a communication manager 1220, and a transmission component 1230. The communication manager 1220 further includes an SP signaling component 1222. Portions of the SP signaling component 1222 may be implemented at least in part in hardware or firmware. In some implementations, the SP signaling component 1222 is implemented at least in part as software stored in a memory (such as the memory 240 of FIG. 2 or the memory 330 of FIG. 3). For example, portions of the SP signaling component 1222 can be implemented as non-transitory instructions (or "code") executable by a processor (such as the processor 320 of FIG. 3) to perform the functions or operations of the respective component.

The reception component 1210 is configured to receive RX signals from one or more other wireless communication devices. In some implementations, the reception component 1210 may receive first timing information indicating a timing of a first SP associated with an OBSS. The communication manager 1220 is configured to manage wireless communications with one or more other wireless communication devices. In some implementations, the SP signaling component 1222 may transmit, to one or more STAs, second timing information indicating the timing of the first SP, where the second timing information is associated with a first TSF timer associated with the wireless communication device. The transmission component 1230 is configured to transmit TX signals to one or more other wireless communication devices. In some implementations, the transmission component 1230 may communicate with the one or more STAs, via a wireless channel, associated with the second timing information.

Figure 13:
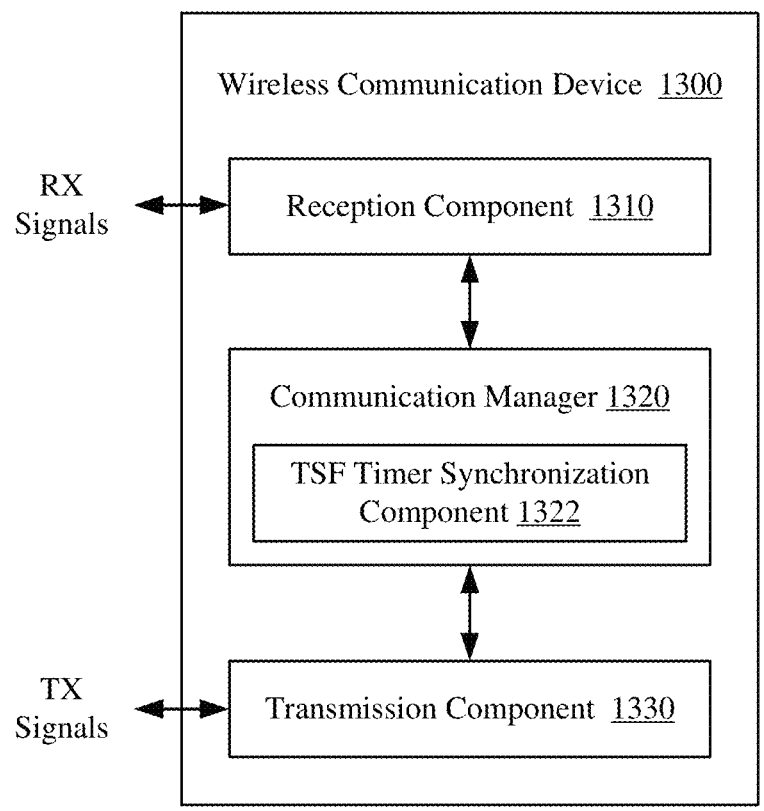
FIG. 13 shows a block diagram of an example wireless communication device.

FIG. 13 shows a block diagram of an example wireless communication device 1300. In some implementations, the wireless communication device 1300 may be configured to perform the operation 1100 described with reference to FIG. 11. The wireless communication device 1300 can be an example implementation of any of the STAs 120a-120i of FIG. 1 or the STA 200 of FIG. 2. More specifically, the wireless communication device 1300 can be a chip, SoC, chipset, package or device that includes at least one processor and at least one modem (for example, a Wi-Fi (IEEE 802.11) modem or a cellular modem).

The wireless communication device 1300 includes a reception component 1310, a communication manager 1320, and a transmission component 1330. The communication manager 1320 further includes a TSF timer synchronization component 1322. Portions of the TSF timer synchronization component 1322 may be implemented at least in part in hardware or firmware. In some implementations, the TSF timer synchronization component 1322 is implemented at least in part as software stored in a memory (such as the memory 240 of FIG. 2 or the memory 330 of FIG. 3). For example, portions of the TSF timer synchronization component 1322 can be implemented as non-transitory instructions (or "code") executable by a processor (such as the processor 220 of FIG. 2) to perform the functions or operations of the respective component.

The reception component 1310 is configured to receive RX signals from one or more other wireless communication devices. In some implementations, the reception component 1310 may receive timing information indicating a timing of a first SP associated with an OBSS, where the timing information is associated with the first TSF timer. The communication manager 1320 is configured to manage wireless communications with one or more other wireless communication devices. In some implementations, the TSF timer synchronization component 1322 may synchronize a local TSF timer with a first TSF timer associated with a BSS. The transmission component 1330 is configured to transmit TX signals to one or more other wireless communication devices. In some implementations, the transmission component 1330 may communicate with one or more devices associated with the BSS associated with the received timing information.

Implementation examples are described in the following numbered clauses:

1. A method for wireless communication by a wireless communication device, including:
receiving first timing information indicating a timing of a first service period (SP) associated with an overlapping basic service set (OBSS);
transmitting, to one or more wireless stations (STAs), second timing information indicating the timing of the first SP, the second timing information being associated with a first timing synchronization function (TSF) timer associated with the wireless communication device; and
communicating with the one or more STAs, via a first wireless channel, associated with the second timing information.
2. The method of clause 1, where the first timing information is different than the second timing information.
3. The method of any of clauses 1 or 2, further including:
receiving, from an access point (AP) associated with the OBSS, a second beacon frame that includes a first timestamp associated with a second TSF timer; and
performing a timer offset calculation operation that indicates an offset between the first TSF timer and the second TSF timer associated with the first timestamp.
4. The method of any of clauses 1-3, where the difference between the first timing information and the second timing information is equal to the offset indicated by the timer offset calculation operation.
5. The method of any of clauses 1-3, further including:
receiving, from the AP, a third beacon frame that includes a second timestamp associated with a second TSF timer; and
performing a clock drift calculation operation that indicates an amount of drift between the first TSF timer and the second TSF timer associated with the first timestamp and the second timestamp.
6. The method of any of clauses 1-3 or 5, where the difference between the first timing information and the second timing information is equal to the offset indicated by the timer offset calculation operation plus a buffer duration that is greater than or equal to the amount of drift indicated by the clock drift calculation operation.
7. The method of any of clauses 1-3 or 5, further including:
transmitting, to the one or more STAs, clock drift information indicating the amount of drift between the first TSF timer and the second TSF timer.
8. The method of clause 1, where the first timing information is equal to the second timing information.
9. The method of any of clauses 1 or 8, further including:
obtaining, from an AP associated with the OBSS, TSF synchronization information associated with a second TSF timer; and
synchronizing the first TSF timer to the second TSF timer associated with the TSF synchronization information.
10. The method of any of clauses 1, 8, or 9, where the TSF synchronization information is received over a second wireless channel that is different than the first wireless channel.
11. The method of any of clauses 1 or 8-10, where the TSF synchronization information is received during a second SP that is different than the first SP.
12. The method of any of clauses 1 or 8-11, where the obtaining of the TSF synchronization information includes:
receiving the TSF synchronization information from a STA that intercepts the TSF synchronization information from the AP.
13. The method of any of clauses 1-12, where the communications with the one or more STAs are orthogonal to communications associated with the OBSS during the first SP.
14. The method of any of clauses 1-13, where the communicating with the one or more STAs includes:
transmitting scheduling information indicating a second SP associated with the wireless communication device, the communications with the one or more STAs occurring during the second SP.
15. The method of any of clauses 1-14, further including:
transmitting a quiet element associated with the first TSF timer, the quiet element indicating a quiet interval that overlaps the first SP.
16. A wireless communication device, including:
a processing system; and
an interface configured to:
receive first timing information indicating a timing of a first service period (SP) associated with an overlapping basic service set (OBSS);
transmit, to one or more wireless stations (STAs), second timing information indicating the timing of the first SP, the second timing information being associated with a first timing synchronization function (TSF) timer associated with the wireless communication device; and
communicate with the one or more STAs associated with the second timing information.
17. The wireless communication device of clause 16, where the first timing information is different than the second timing information, and where:
the interface is further configured to receive, from an access point (AP) associated with the OBSS, a second beacon frame that includes a first timestamp associated with a second TSF timer; and
the processing system is further configured to perform a timer offset calculation operation that indicates an offset between the first TSF timer and the second TSF timer associated with the first timestamp.
18. The wireless communication device of any of clauses 16 or 17, where the difference between the first timing information and the second timing information is equal to the offset indicated by the timer offset calculation operation.
19. The wireless communication device of any of clauses 16 or 17, where:
the interface is further configured to receive, from the AP, a third beacon frame that includes a second timestamp associated with a second TSF timer; and
the processing system is further configured to perform a clock drift calculation operation that indicates an amount of drift between the first TSF timer and the second TSF timer associated with the first timestamp and the second timestamp.
20. The wireless communication device of any of clauses 16, 17, or 19, where the difference between the first timing information and the second timing information is equal to the offset indicated by the timer offset calculation operation plus a buffer duration that is greater than or equal to the amount of drift indicated by the clock drift calculation operation.
21. The wireless communication device of any of clauses 16, 17, or 19, where the interface is further configured to transmit, to the one or more STAs, clock drift information indicating the amount of drift between the first TSF timer and the second TSF timer.

22. The wireless communication device of clause 16, where the first timing information is equal to the second timing information, the processing system being further configured to:
obtain, from an access point (AP) associated with the OBSS, TSF synchronization information associated with a second TSF timer; and
synchronize the first TSF timer to the second TSF timer associated with the TSF synchronization information.

23. The wireless communication device of any of clauses 16-22, where the interface is further configured to transmit a quiet element associated with the first TSF timer, the quiet element indicating a quiet interval that overlaps the first SP.

24. A method performed by a wireless communication device, including:
synchronizing a local timing synchronization function (TSF) timer with a first TSF timer associated with a basic service set (BSS);
receiving timing information indicating a timing of a first service period (SP) associated with an overlapping basic service set (OBSS), the timing information being associated with the first TSF timer; and
communicating with one or more devices associated with the BSS and the received timing information.

25. The method of clause 24, where the communicating with the BSS includes:
receiving clock drift information indicating an amount of drift between the first TSF timer and a second TSF timer associated with the OBSS, the communications with the one or more devices being further associated with the received clock drift information.

26. The method of clause 24, further including:
receiving, from a first access point (AP) associated with the OBSS, TSF synchronization information associated with a second TSF timer; and
transmitting the TSF synchronization information to a second AP associated with the BSS.

27. The method of any of clauses 24-26, where the communications with the one or more devices are orthogonal to communications associated with the OBSS during the first SP.

28. The method of any of clauses 24-27, where the communicating with the one or more devices includes:
receiving scheduling information indicating a second SP associated with the BSS, the communications with the one or more devices occurring during the second SP.

29. A wireless communication device, including:
a processing system configured to synchronize a local timing synchronization function (TSF) timer with a first TSF timer associated with a basic service set (BSS); and
an interface configured to:
receive timing information indicating a timing of a service period (SP) associated with an overlapping basic service set (OBSS), the timing information being associated with the first TSF timer; and
communicate with one or more devices associated with the BSS and the received timing information.

30. The wireless communication device of clause 29, where the interface is further configured to receive clock drift information indicating an amount of drift between the first TSF timer and a second TSF timer associated with the OBSS, the communications with the one or more devices being further associated with the received clock drift information.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described herein. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described herein as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method performed by a first wireless communication device, comprising:

obtaining first timing information associated with a second wireless communication device;

transmitting, to one or more wireless stations (STAs), second timing information, the second timing information being in accordance with a first timing synchronization function (TSF) timer associated with the first wireless communication device; and communicating with the one or more STAs, via a first wireless channel, associated with the second timing information.

2. The method of claim 1, wherein the first timing information is different than the second timing information.

3. The method of claim 2, further comprising:

receiving, from an access point (AP) associated with the second wireless communication device, a management frame that includes a first timestamp in accordance with a second TSF timer; and performing a timer offset calculation operation that indicates an offset between the first TSF timer and the second TSF timer associated with the first timestamp.

4. The method of claim 3, wherein a difference between the first timing information and the second timing information is equal to the offset indicated by the timer offset calculation operation.

5. The method of claim 3, further comprising:

receiving, from the AP, a second management frame that includes a second timestamp in accordance with a second TSF timer; and performing a clock drift calculation operation that indicates an amount of drift between the first TSF timer and the second TSF timer associated with the first timestamp and the second timestamp.

6. The method of claim 5, wherein a difference between the first timing information and the second timing information is equal to the offset indicated by the timer offset calculation operation plus a buffer duration that is greater than or equal to the amount of drift indicated by the clock drift calculation operation.

7. The method of claim 5, further comprising:

transmitting, to the one or more STAs, clock drift information indicating the amount of drift between the first TSF timer and the second TSF timer.

8. The method of claim 1, wherein the first timing information is equal to the second timing information.

9. The method of claim 8, further comprising:

obtaining, from an access point (AP) associated with the second wireless communication device, TSF synchronization information in accordance with a second TSF timer; and synchronizing the first TSF timer to the second TSF timer associated with the TSF synchronization information.

10. The method of claim 9, wherein the TSF synchronization information is received over a second wireless channel that is different than the first wireless channel.

11. The method of claim 9, wherein the first timing information and the second timing information both indicate a timing of a first service period (SP), and wherein the TSF synchronization information is received during a second SP that is different than the first SP.

12. The method of claim 9, wherein the obtaining of the TSF synchronization information comprises:

receiving the TSF synchronization information from a STA that intercepts the TSF synchronization information from the AP.

13. The method of claim 1, wherein communications with the one or more STAs are orthogonal to communications associated with the second wireless communication device in accordance with a first timestamp indicated by the first timing information.

14. The method of claim 13, wherein the first timestamp is associated with a timing of a first service period (SP), and wherein the communicating with the one or more STAs comprises:

transmitting scheduling information indicating a second SP associated with the first wireless communication device, the communications with the one or more STAs occurring during the second SP.

15. The method of claim 1, further comprising:

transmitting an indication of a quiet interval in accordance with the first TSF timer in accordance with obtaining the first timing information.

16. A first wireless communication device, comprising:

a processing system; and an interface configured to:

obtain first timing information associated with a second wireless communication device;

transmit, to one or more wireless stations (STAs), second timing information, the second timing information being in accordance with a first timing synchronization function (TSF) timer associated with the first wireless communication device; and communicate with the one or more STAs associated with the second timing information.

17. The first wireless communication device of claim 16, wherein the first timing information is different than the second timing information, and wherein:

the interface is further configured to receive, from an access point (AP) associated with the second wireless communication device, a management frame that includes a first timestamp in accordance with a second TSF timer; and the processing system is further configured to perform a timer offset calculation operation that indicates an offset between the first TSF timer and the second TSF timer associated with the first timestamp.

18. The first wireless communication device of claim 17, wherein a difference between the first timing information and the second timing information is equal to the offset indicated by the timer offset calculation operation.

19. The first wireless communication device of claim 17, wherein:

the interface is further configured to receive, from the AP, a second management frame that includes a second timestamp in accordance with a second TSF timer; and the processing system is further configured to perform a clock drift calculation operation that indicates an amount of drift between the first TSF timer and the second TSF timer associated with the first timestamp and the second timestamp.

20. The first wireless communication device of claim 19, wherein a difference between the first timing information and the second timing information is equal to the offset indicated by the timer offset calculation operation plus a buffer duration that is greater than or equal to the amount of drift indicated by the clock drift calculation operation.

21. The first wireless communication device of claim 19, wherein the interface is further configured to transmit, to the one or more STAs, clock drift information indicating the amount of drift between the first TSF timer and the second TSF timer.

22. The first wireless communication device of claim 16, wherein the first timing information is equal to the second timing information, the processing system being further configured to:
    obtain, from an access point (AP) associated with the second wireless communication device, TSF synchronization information in accordance with a second TSF timer; and
    synchronize the first TSF timer to the second TSF timer associated with the TSF synchronization information.

23. The first wireless communication device of claim 16, wherein the interface is further configured to transmit an indication of a quiet interval in accordance with the first TSF timer in accordance with obtaining the first timing information.

24. A method performed by a first wireless communication device, comprising:
    synchronizing a local timing synchronization function (TSF) timer with a first TSF timer of a second wireless communication device;
    obtaining timing information associated with a third wireless communication device, the timing information being in accordance with the first TSF timer; and
    communicating with one or more devices associated with a basic service set (BSS) in accordance with the timing information.

25. The method of claim 24, wherein the communicating with the one or more devices comprises:
    receiving clock drift information indicating an amount of drift between the first TSF timer and a second TSF timer of the third wireless communication device, communications with the one or more devices being further associated with the clock drift information.

26. The method of claim 24, further comprising:
    receiving, from a first access point (AP) associated with the third wireless communication device, TSF synchronization information associated with a second TSF timer; and
    transmitting the TSF synchronization information to a second AP associated with the second wireless communication device.

27. The method of claim 24, wherein communications with the one or more devices are orthogonal to communications associated with the third wireless communication device in accordance with a first timestamp indicated by the timing information.

28. The method of claim 27, wherein the first timestamp is associated with a timing of a first service period (SP), and wherein the communicating with the one or more devices comprises:
    receiving scheduling information indicating a second SP associated with the BSS, the communications with the one or more devices occurring during the second SP.

29. A first wireless communication device, comprising:
    a processing system configured to synchronize a local timing synchronization function (TSF) timer with a first TSF timer of a second wireless communication device; and
    an interface configured to:
        obtain timing information associated with a third wireless communication device, the timing information being in accordance with the first TSF timer; and
        communicate with one or more devices associated with a basic service set (BSS) in accordance with the timing information.

30. The first wireless communication device of claim 29, wherein the interface is further configured to receive clock drift information indicating an amount of drift between the first TSF timer and a second TSF timer of the third wireless communication device, communications with the one or more devices being further associated with the clock drift information.

31. The first wireless communication device of claim 23, wherein the indication of the quiet interval is transmitted within one or more fields of a quiet element.

32. The first wireless communication device of claim 16, wherein the first timing information and the second timing information indicate a timing of a first service period (SP) associated with the second wireless communication device.

33. The first wireless communication device of claim 32, wherein the timing of the first SP comprises an indication of a start time of the first SP.

34. The first wireless communication device of claim 16, wherein the first timing information indicates a first timestamp in accordance with a second TSF timer and the second timing information indicates a second timestamp in accordance with the first TSF timer.

35. The first wireless communication device of claim 16, wherein the interface is further configured to receive scheduling information associated with coordinated operation between a plurality of wireless communication devices in accordance with the first timing information, wherein the coordinated operation is associated with prioritized channel access for at least a subset of the plurality of wireless communication devices.

36. The first wireless communication device of claim 35, wherein the prioritized channel access is associated with at least one of: one or more signaled timestamps associated with the second wireless communication device, a first service period (SP) associated with the second wireless communication device, one or more quiet intervals indicated for relatively lower priority wireless communication devices, relatively larger arbitration interframe spacing (AIFS) durations for the relatively lower priority wireless communication devices, or relatively larger random backoff (RBO) durations for the relatively lower priority wireless communication devices.

37. The first wireless communication device of claim 16, wherein the first timing information indicates a timing of a first service period (SP), and wherein the interface is further configured to:
    transmit scheduling information indicating a second SP associated with the first wireless communication device, communications with the one or more STAs occurring during the second SP, wherein the first SP and the second SP at least partially overlap in time.

38. The first wireless communication device of claim 37, wherein:
    first frequency resources associated with the first SP are orthogonal to second frequency resources associated with the second SP; or
    communications associated with the second wireless communication device during the first SP are associated with a first transmit power and the communications with the one or more STAs during the second SP are associated with a second transmit power, the first transmit power and the second transmit power being selected in accordance with a first priority of the communications associated with the second wireless communication device and a second priority of the communications with the one or more STAs.

39. The first wireless communication device of claim 16, wherein:

the processing system is further configured to schedule a set of service periods (SPs); and the interface is further configured to periodically transmit a management frame during each of the set of SPs.

40. The first wireless communication device of claim 39, wherein a first management frame transmitted during an SP of the set of SPs includes the second timing information.

41. The first wireless communication device of claim 16, wherein the second wireless communication device is associated with an overlapping basic service set (OBSS).

42. The first wireless communication device of claim 16, wherein the first timing information is obtained by receiving a management frame from an access point (AP) associated with the second wireless communication device.

43. The first wireless communication device of claim 29, wherein the first wireless communication device is a first access point (AP), the second wireless communication device is a second AP, and the third wireless communication device is a third AP, and wherein the third AP is associated with an overlapping basic service set (OBSS).

44. The first wireless communication device of claim 29, wherein the first wireless communication device is a wireless station (STA) associated with the second wireless communication device, the second wireless communication device is a first access point (AP), and the third wireless communication device is a second AP, and wherein the second AP is associated with an overlapping basic service set (OBSS).

* * * * *